(12) United States Patent
Zhang et al.

(10) Patent No.: US 12,464,497 B2
(45) Date of Patent: Nov. 4, 2025

(54) USER EQUIPMENT (UE) DATA AND CARRIER CONFIGURATION DATA BASED CELLULAR NETWORK MANAGEMENT

(71) Applicant: T-Mobile USA, Inc., Bellevue, WA (US)

(72) Inventors: Elizabeth Zhang, Seattle, WA (US); Jake Michael Reaves, Tucson, AZ (US); Lin Zhang, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 420 days.

(21) Appl. No.: 18/190,640

(22) Filed: Mar. 27, 2023

(65) Prior Publication Data
US 2024/0334394 A1 Oct. 3, 2024

(51) Int. Cl.
*H04W 72/02* (2009.01)
*H04W 48/08* (2009.01)

(52) U.S. Cl.
CPC ........... *H04W 72/02* (2013.01); *H04W 48/08* (2013.01)

(58) Field of Classification Search
CPC .............................. H04W 48/08; H04W 72/02
See application file for complete search history.

(56) References Cited

U.S. PATENT DOCUMENTS

| 2005/0090235 | A1* | 4/2005 | Vermola | H04N 21/63775 |
| | | | | 348/E7.071 |
| 2010/0088367 | A1* | 4/2010 | Brown | G06F 8/60 |
| | | | | 455/414.1 |
| 2011/0095886 | A1* | 4/2011 | Bakker | H04L 65/1016 |
| | | | | 340/540 |
| 2012/0212668 | A1* | 8/2012 | Schultz | H04N 5/772 |
| | | | | 348/E7.02 |
| 2012/0321143 | A1* | 12/2012 | Krupka | G06V 20/30 |
| | | | | 382/118 |
| 2013/0290439 | A1* | 10/2013 | Blom | G06Q 50/01 |
| | | | | 709/206 |
| 2022/0167244 | A1* | 5/2022 | Zaus | H04L 69/24 |
| 2023/0370964 | A1* | 11/2023 | Chaponniere | H04W 48/18 |

* cited by examiner

*Primary Examiner* — Fabricio R Murillo Garcia
(74) *Attorney, Agent, or Firm* — Lee & Hayes, P.C.

(57) ABSTRACT

Described herein are techniques, devices, and systems for managing, by service providers, telecommunication network selection data, which can include user equipment (UE) data and carrier configuration data. The UE data, which can be identified based on user selections of toggles displayed in user interfaces (UIs) of UEs, and the carrier configuration data, can be utilized for selections of networks and/or network services for the UEs. The carrier configuration data can be utilized to override the UE data.

17 Claims, 12 Drawing Sheets

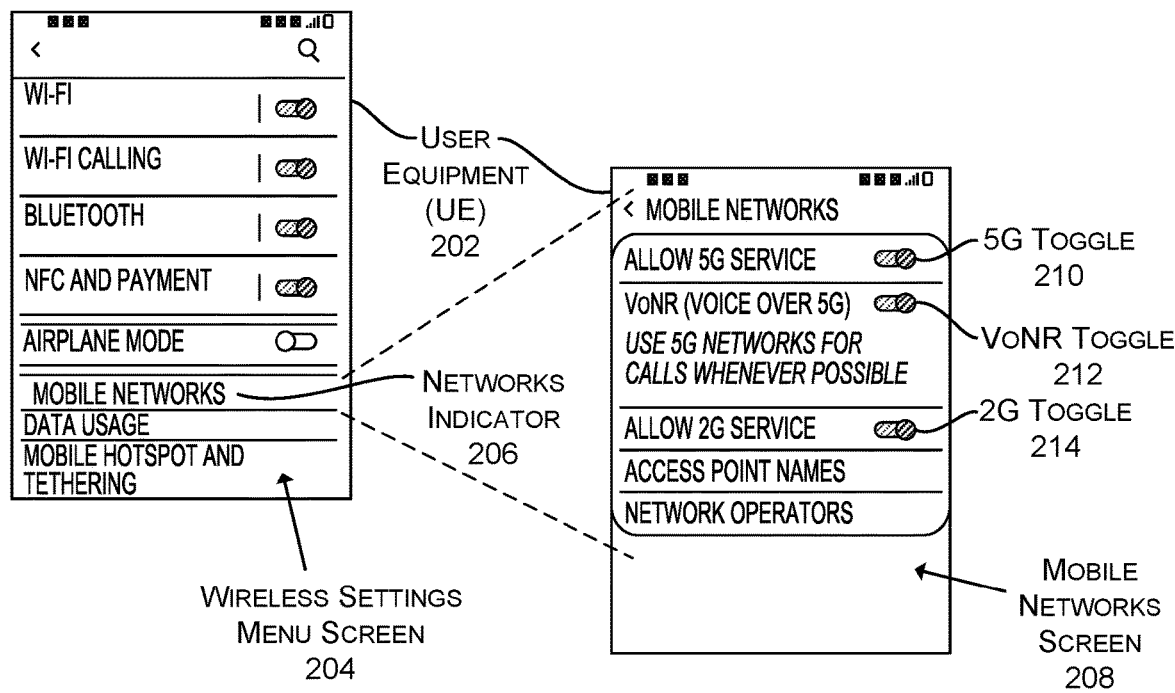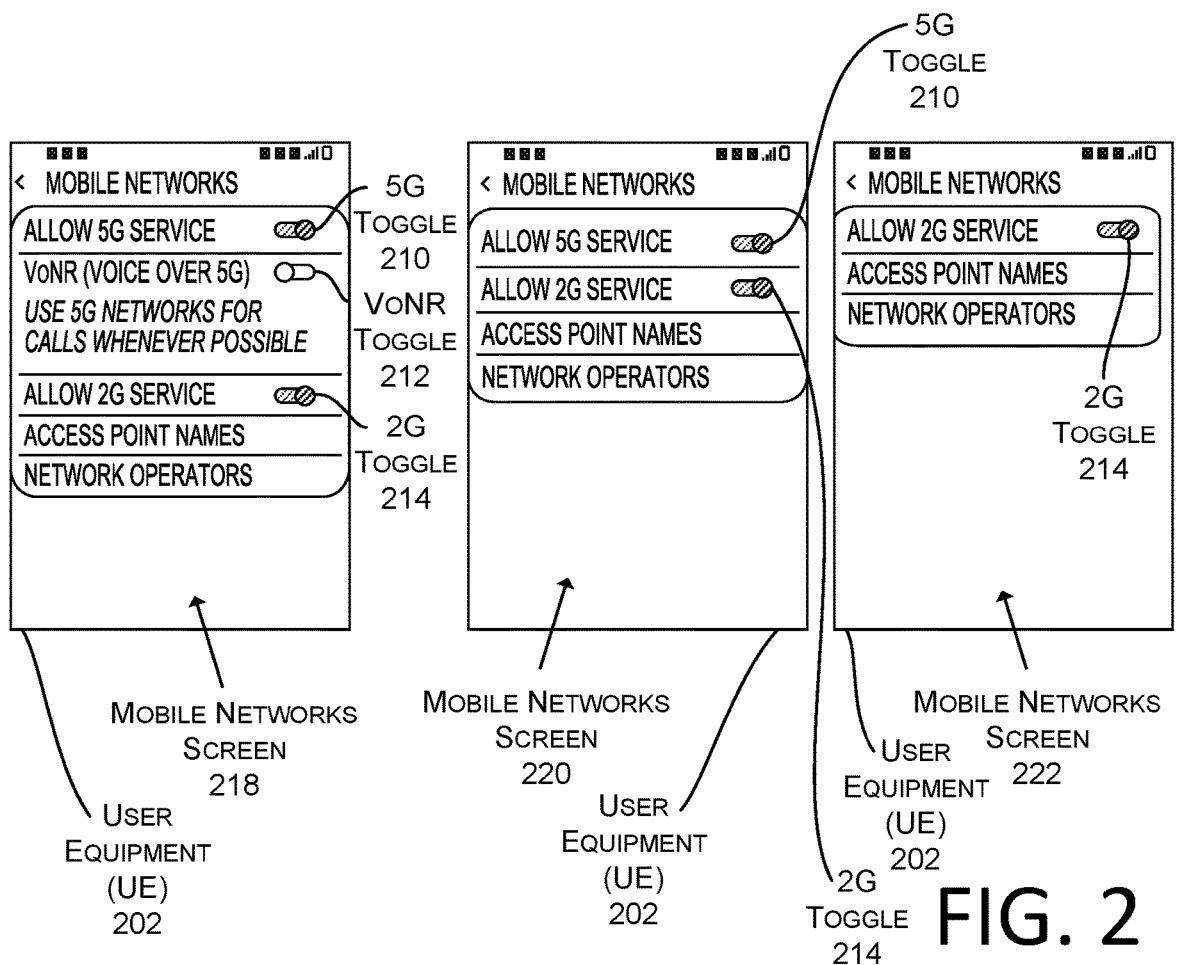
FIG. 2

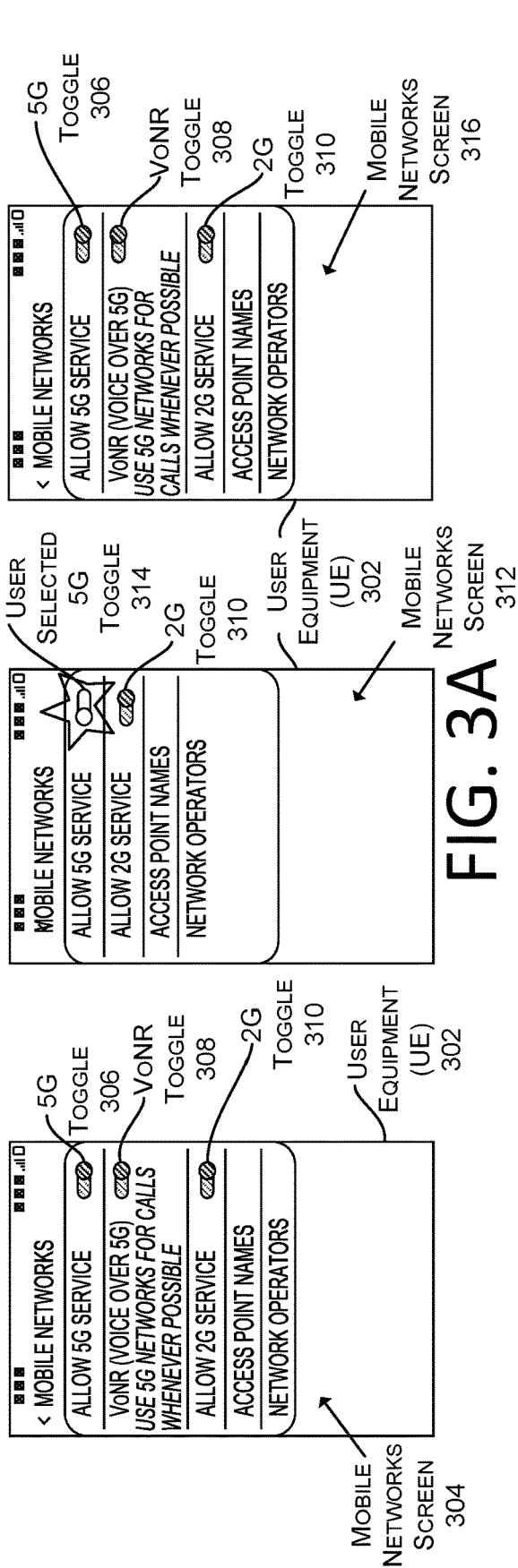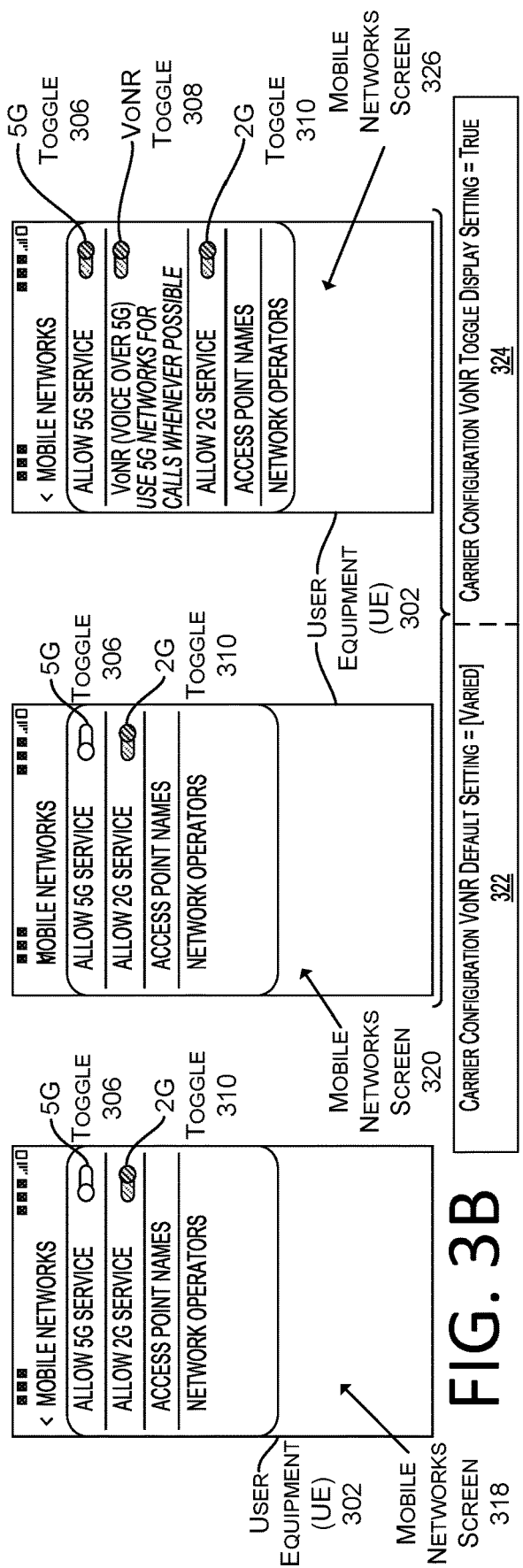
FIG. 3A
FIG. 3B

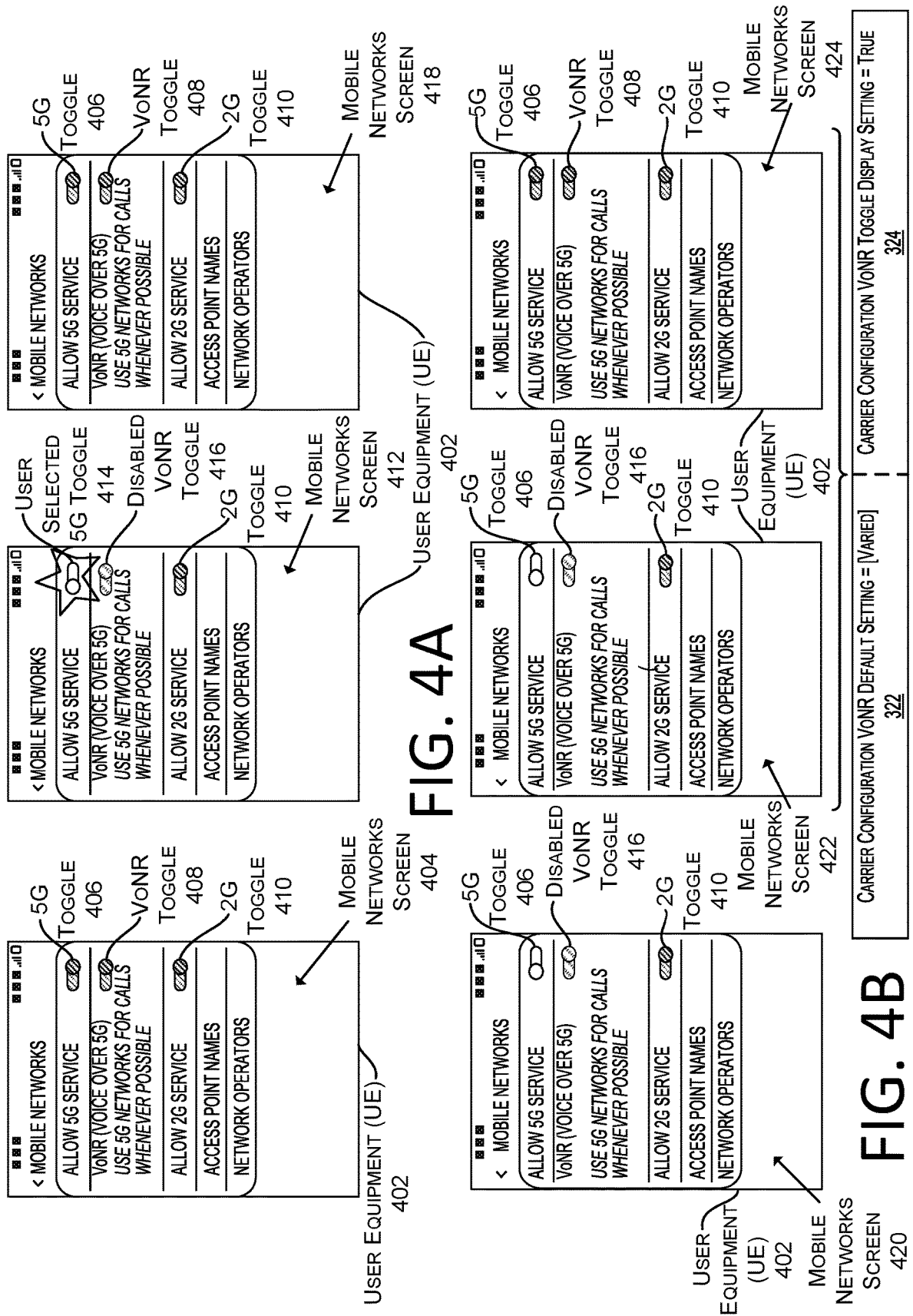

USER EQUIPMENT (UE) DATA AND CARRIER CONFIGURATION DATA BASED CELLULAR NETWORK MANAGEMENT

BACKGROUND

Telecommunications carriers manage mobile networks of various types for exchanging cellular communications with user equipment (UEs). Service providers and UEs include functionality to enable the UEs to connect to cellular networks. As numbers and varieties of the different types of cellular networks and/or services made available for use by the UEs continue to increase, challenges in determining which of the cellular networks and/or services to select for exchanging communications with the UEs are becoming more complex and widespread. Limitations of the service providers and the UEs may prevent the service providers, and users of the UEs, from being able to set and modify selections of the cellular networks and/or services. Service quality experienced by the UEs may be negatively affected in certain situations due to limitations of network and/or services selection management capabilities for the UEs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a diagram illustrating example user equipment (UE) user interface (UI) screens for selecting cellular networks and/or services associated with a UE, as described herein.

FIGS. 3A and 3B are a diagrams illustrating example user equipment (UE) user interface (UI) screens for selecting cellular networks and/or services for a UE, based on a UE voice over new radio (VoNR) identifier being toggled on and then a network service identifier being toggled on, without a carrier configuration VoNR toggle display setting being used, in comparison to the network service identifier being toggled on, with the carrier configuration VoNR toggle display setting being used and set to true, as described herein.

FIGS. 4A and 4B are diagrams illustrating example user equipment (UE) user interface (UI) screens as illustrated above in FIG. 3, except with a UE voice over new radio (VoNR) identifier being disabled instead of hidden, as described herein.

DETAILED DESCRIPTION

Figure 1:
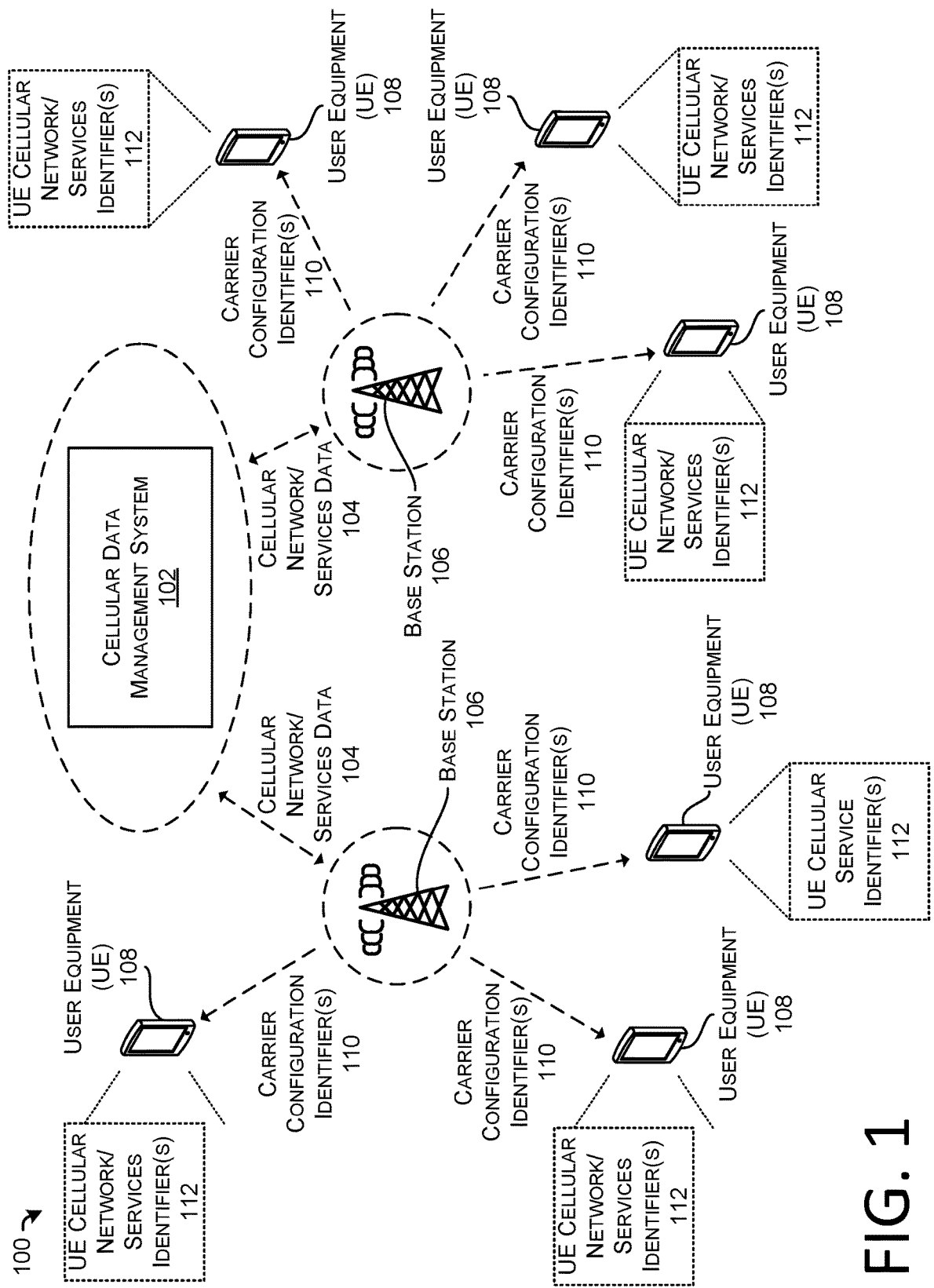
FIG. 1 schematically illustrates an example network environment for cellular network and/or services data management based on user equipment (UE) settings data and carrier configuration data, in accordance with some examples of the present disclosure.

Techniques described herein are directed to utilizing telecommunication network and/or services selection data, such as carrier configuration data, user equipment (UE) cellular networks and/or services data, or a combination thereof, to manage selections of networks and/or services for providing cellular networks and/or services for use by UEs. In some examples, service providers can manage the telecommunication network and/or services selection data, which can include the carrier configuration data being utilized for the selections of the networks and/or services for the UEs. The carrier configuration data can be identified based on service provider data, UE data, or a combination thereof. In those or other examples, the telecommunication network and/or services selection data being managed by the service providers can include the UE cellular network and/or services data being utilized for the network and/or services selections for the UEs. The UE cellular network and/or services data can be received from the UEs based on user input to the UEs.

The carrier configuration data, which can include carrier configuration identifiers associated with the UEs, can be utilized to manage selections of the networks (e.g., the networks to which the UEs are connected) and/or services (e.g., the services being utilized by the UEs), manage presentation by the UEs of the UE cellular networks and/or services data, or a combination thereof. The carrier configuration identifiers can include identifiers associated with telecommunication networks, services (e.g., data services, voice services, etc.), or a combination thereof. The carrier configuration identifiers can be managed by the service providers determining the carrier configuration identifiers, such as to optimize service quality for the UEs. In some examples, the carrier configuration identifiers can be utilized to set and/or modify the selections of the networks (e.g., the networks to which the UEs are connected) and/or the services (e.g., the services being utilized by the UEs). In those or other examples, the carrier configuration data can include carrier configuration override data. The carrier configuration identifiers and the carrier configuration override data can be utilized to manage the presentation by the UEs of the UE network and/or services service data.

The UE network and/or services service data can include UE cellular network and/or services identifiers being received from the UEs based on user selections of the UE cellular network and/or services identifiers via user input to the UEs. In some examples, the user selections can be received via user input to toggle buttons (e.g., toggle button indicators) (or "toggles") of the UEs. The UEs can identify values of the UE cellular network and/or services identifiers based on the user selections. The UE cellular network and/or services identifiers can include identifiers associated with telecommunication networks, services (e.g., data services, voice services, etc.), or a combination thereof. Presentation by the UEs of the UE cellular network and/or services identifiers can be managed based on the carrier configuration data, such as the carrier configuration identifiers, the carrier configuration override data, or a combination thereof.

The techniques and systems described herein improve functions of computing devices operated by service providers by decreasing numbers of network transitions for UEs. By efficiently and accurately identifying networks and services to optimize service quality for UEs, times at which the UEs are connected to the most preferential networks are relatively earlier than they otherwise would be according to existing systems. The telecommunication data utilized to select networks and/or services for UEs according to the techniques discussed herein, which are relatively more intuitive and robust than techniques for selecting networks based on user selections according to existing systems, enable the relatively more efficient and accurate selection of the networks and/or services for the UEs.

The network and/or services selection techniques as discussed herein conserve compute resources and memory resources associated with the service provider devices. The compute resources for the service provider devices are conserved more effectively than in existing technology, as a result of the service provider devices according to the techniques discussed herein being required to process fewer modifications of network and/or services selections. By utilizing various types of data, which includes carrier configuration data and UE cellular network and/or services data, in combination with relatively simple and straightforward network and/or services selection indicators displayed by UEs, relatively fast, robust, and secure networks and/or services may be accurately selected from groups of available networks to efficiently and effectively manage cellular communications, to reduce errors, and to minimize occurrences of fraudulent actions. The memory resources for the service provider devices are conserved more effectively than in existing technology, as a result of the service provider devices being required to store smaller amounts of error status data and/or fraudulent actions data since numbers of errors and/or fraudulent actions associated with network and/or services selections are decreased.

The network and/or services selection techniques as discussed herein conserve compute resources and memory resources associated with the UEs. The compute resources for the UEs can be conserved more effectively than in existing technology, as a result of the UEs according to the techniques discussed herein being required to process fewer modifications of networks (e.g., networks to which the UEs are connected) and/or of services (e.g., service being utilized by the UEs). Relatively fewer user selections of network and/or services modifications resulting from the greater effectiveness of the network and/or services identifier selections enabled by user interfaces (UIs) of the UEs according to the techniques discussed herein enable compute resources that would otherwise be expended by existing systems to be allocated for other purposes.

Compute resources associated with the UEs can be conserved according to the techniques discussed herein, which include relatively simpler indicators being displayed than in existing UEs. Unlike visually and computationally complex indicators displayed according to conventional technology, such as drop down menus with relatively lengthy textual or graphical elements, toggle switches being displayed according to the techniques discussed herein conserve compute and memory resources. Fewer unintentional and/or undesirable network and/or services selections by users operating the UEs with relatively simple and intuitive toggle switches according to the techniques discussed herein, in comparison to users with existing UEs, reduce strains on compute resources.

The memory resources for the UEs can be conserved more effectively than in existing technology, as a result of the UEs according to the techniques discussed herein being required to store fewer amounts of error status data since numbers of errors (e.g., user errors, device errors, etc.) in network and/or services selections are decreased. The compute resources and the memory resources of the UEs may be utilized with greater efficacy by eliminating requirements for storing unnecessary and/or extraneous data that would otherwise be required for presentation of the unnecessary and/or extraneous data by displays of conventional systems, due to the unnecessary and/or extraneous information being hidden from the displays of the UEs according to the techniques discussed herein.

Utilization of network resources associated with the service provider devices and the UEs is greatly improved by the techniques as discussed herein. The service provider devices and the UEs utilizing the above-mentioned telecommunication network and/or services selection data to manage network and/or services selections for the UEs reduce overall demands on the network resources by enabling selections of networks and/or services for the UEs to occur relatively sooner and relatively more effectively than in conventional systems. The UEs being efficiently connected to optimal networks according to the techniques discussed herein enable network resources that would otherwise be used for more frequently occurring, and often undesirable, network and/or services selections to be allocated for other purposes. The network resources being allocated, or being made available to be allocated, for other purposes increases, or enables an increase in, data flow, network performance, service quality, and available bandwidth of networks according to the techniques discussed herein.

The systems, devices, and techniques described herein can be implemented in a number of ways. References are made to the accompanying drawings that form a part hereof, and in which are shown by way of illustration specific configurations or examples, in which like numerals represent like elements throughout the several figures.

Illustrative Systems for User Equipment (UE) Data and Carrier Configuration Data Based Cellular Management FIG. 1 schematically illustrates an example network environment 100 for cellular network and/or services data management based on user equipment (UE) settings data and carrier configuration data, in accordance with some examples of the present disclosure.

The environment 100 can include a cellular data management system (or "cellular network and/or services data management system") (or "telecommunication network and/or services selection data management system")) 102 utilized to manage cellular data (or "cellular network and/or services data") (or "telecommunication network and/or services selection data") 104 for one or more network selections (e.g., one or more network selections of one or more networks in the environment 100) and/or one or more services selections (e.g., one or more services selections of one or more services). The cellular data management system 102 can be included in, utilized along with, and/or integrated within, one or more service provider systems of one or more service providers. The environment 100 can include one or more base stations 106 associated with the network(s), and one or more UEs 108. The base station(s) 106 can be included in, utilized along with, and/or integrated within, the cellular data management system 102 and/or the service provider system(s).

The cellular network and/or services data 104 can include carrier configuration data, which can include one or more carrier configuration identifiers 110. The carrier configuration identifier(s) 110 can be determined by the cellular data management system 102 and utilized to manage one or more connections (or "network connection(s)") of the UE(s) 108 to the network(s). The carrier configuration identifier(s) 110 can be transmitted (e.g., pushed) by the cellular data management system 102 and to the UE(s) 108, via the base station(s) 106.

In some examples, individual ones of the carrier configuration identifier(s) 110 can be an identifier of a network and/or a setting (e.g., a setting for a service) selected by a carrier (e.g., a carrier and/or service provider operating the cellular data management system 102) for a UE (e.g., a UE 108). In those or other examples, individual ones of the carrier configuration identifier(s) 110 can refer to an identifier (or "setting") (e.g., an identifier of a setting) (e.g., a carrier configuration VoNR default setting 322 and/or a carrier configuration VoNR toggle display setting 324, as discussed below with respect to FIG. 3) (e.g., a network default setting, such as a 5G default setting, etc.) (e.g., a network toggle display setting, such as a 5G toggle display setting, etc.) of a network and/or a setting (e.g., a setting for a service) selected by a carrier (e.g., a carrier and/or service provider operating the cellular data management system 102). In those or other examples, individual ones of the carrier configuration identifier(s) 110 can refer to a combined identifier that includes a combination of carrier configuration identifiers.

The cellular network and/or services data 104 can include UE cellular network and/or services data (or "UE network and/or services data") (or "UE data"), which can include one or more UE cellular network and/or services identifiers 112. The UE cellular network and/or services identifier(s) 112 can be identified by the UE(s) 108 based on one or more user selections received by the UE(s) 108 via user input to one or more user interfaces (UIs) of the UE(s) 108. In some examples, the user selection(s) can be received via user input to one or more toggle buttons (e.g., one or more toggle button indicators) (e.g., one or more toggle switches) (or "toggle(s)") of the UI(s) (e.g., touch display(s)) of the UE(s) 108. The UE cellular network and/or services identifier(s) 112 can be transmitted to, and/or utilized by, the cellular data management system 102 to manage the network connection(s).

In some examples, individual ones of the UE cellular network and/or services identifier(s) 112 can be an identifier of a network and/or a service selected by a UE (e.g., a UE 108), such as by a user of the UE 108 via user input. In those or other examples, individual ones of the UE cellular network and/or services identifier(s) 112 can refer to an indicator (e.g., an indicator presented by the UE 108) (e.g., a toggle) (e.g., a setting) of a network and/or a service selected by the UE, for the UE (e.g., the UE 108). In those or other examples, individual ones of the UE cellular network and/or services identifier(s) 112 can refer to a combined identifier that includes a combination of UE cellular network and/or services identifiers.

The cellular network and/or services data 104 (e.g., the carrier configuration identifier(s) 110) and/or the UE cellular network and/or services data (e.g., the UE cellular network and/or services identifier(s) 112)) managed by the cellular data management system 102 can include cellular network data (e.g., one or more cellular networks), service data (or "one or more cellular services"), network and/or services type data (or "cellular network and/or services type data") (e.g., one or more cellular network and/or services types of one or more network and/or services for data, one or more cellular network and/or services types of one or more network and/or services for voice, etc.), cellular settings data (e.g., one or more cellular settings), and so on or any combination thereof.

The network(s) can include a fifth generation (5G) network, a long-term evolution (LTE) network (e.g., a fourth generation (4G) network), a third generation (3G) network, a second generation (2G) network, and the like, or any combination thereof. The service(s) can include one or more data services (e.g., 5G data services (or "5G"), LTE data services (or "LTE"), 3G data services (or "3G"), 2G data services (or "2G"), etc.), one or more voice services (e.g., voice over new radio (VoNR) services (or "VoNR"), voice over LTE (VoLTE) services (or "VoLTE"), circuit switched (CS) voice services (or "CS voice"), etc.), and the like, one or more services of any other type, or any combination thereof. The cellular network and/or services type(s) can include one or more data services, one or more voice services, etc.

The cellular setting data (e.g., the cellular setting(s)) can include network settings data (e.g., one or more network settings), cellular network and/or services settings data (e.g., one or more cellular network and/or services settings), and so on, or any combination thereof. In various implementations, other settings data (e.g. one or more other settings) of various types can be managed, additionally or alternatively, to the cellular network and/or services settings data (e.g., the cellular network and/or services setting(s)), the other settings data being managed including service type settings data (e.g., one or more cellular network and/or services type settings), presentation settings data (e.g., one or more presentation settings), software settings data (e.g., one or more software settings), override settings data (e.g., one or more override settings, etc.), and so on, or any combination thereof. In some examples, any settings data, such as the cellular setting data (e.g., the cellular network and/or services settings data, the other settings data, etc.), can be integrated and managed together, or be independent and managed separately, in a similar way as for the cellular network and/or services settings data, to implement any techniques as discussed herein.

The network setting(s) can include, for example, one or more settings associated with one or more characteristics of the network(s). The settings associated with the network characteristic(s) can, for example, identify, and/or enable the UE(s) 108 to utilize, at least one of the network(s) (e.g., the 5G network, the LTE network, the 3G network, the 2G network, etc.). The network characteristic(s) can include, for example, one or more versions of the network(s), one or more parameters associated with operation of the network(s), one or more network identifiers of the network(s), and so on, or any combination thereof.

The cellular network and/or services setting(s) can include, for example, one or more settings associated with one or more characteristics of the service(s). The settings associated with the service characteristic(s) can, for example, identify, and/or enable the UE(s) 108 to utilize, at least one of the service(s) (e.g., the 5G service, the LTE service, etc.). The network characteristic(s) can include, for example, at least one identifier indicating at least one of the cellular network and/or services is at least one particular service (e.g., the 5G service), at least one identifier indicating at least one of the cellular network and/or services is at least one particular service (e.g., the LTE service), and so on, or any combination thereof.

The cellular network and/or services type setting(s) can include, for example, one or more settings associated with one or more characteristics of the service type(s). The settings associated with the service type characteristic(s) can, for example, identify, and/or enable the UE(s) 108 to utilize, at least one of the service type(s). In some examples, the settings associated with the service type characteristic(s) can be generic (e.g., ambiguous) with respect to any particular service, such as 5G, VoNR, LTE, VoLTE, etc. The service type characteristic(s) can, for example, include the data service, the voice service, etc.

The network characteristic(s) can, for example, identify, and/or enable the UE(s) 108 to utilize, at least one of the network(s). The network characteristic(s) can include, for example, one or more parameters (e.g., one or more 5G network parameters, one or more LTE network parameters, etc.) of the corresponding network(s).

The presentation setting(s) can include, for example, one or more settings associated with one or more characteristics of presentation(s) by the UE(s) 108 of the cellular network and/or services data 104. The setting(s) (e.g., a visible setting, a hidden setting, a blinking setting, a size setting, a solid line setting, a dotted-line setting, a pattern setting, a color setting, a brightness setting, etc.) associated with one or more characteristics of the presentation(s) can be utilized to present, and/or cause presentation, by the UE(s) 108 of at least one of the carrier configuration data (e.g., the carrier configuration identifier(s) 110) and/or the UE cellular network and/or services data (e.g., the UE cellular network and/or services identifier(s) 112)).

The software setting(s) can include, for example, one or more settings (e.g., one or more extensible markup language (XML) settings, such as an XML file including the XML settings) associated with one or more software characteristics). For example, with instances in which at least one of the carrier configuration identifier(s) 110 is associated with at least one of the software setting(s), the at least one of the software setting(s) can include a voice service default value (e.g., a VoNR default value), a voice service user toggle display value (e.g., a VoNR user toggle display value), etc.

The override setting(s) can include, for example, one or more settings associated with one or more characteristics of one or more overrides (e.g., overrides based on one or more priorities). The override setting(s) can be associated with, indicate, and/or be utilized to identify, the priority(ies) associated with any of one or more portions (e.g., carrier configuration identifier(s) 110, the UE cellular network and/or services identifier(s) 112, the cellular network(s), the service(s), the service type(s), the cellular setting(s), the network setting(s), the service setting(s), the service type setting(s), the presentation setting(s), the software setting(s), etc.) of the cellular network and/or services data 104.

In some examples, for instance with the override setting(s) being associated with the carrier configuration identifier(s) 110 and/or the UE cellular network and/or services identifier(s) 112, the override setting(s) can be utilized to set at least one of the carrier configuration identifier(s) 110 of a network to have a priority that is different from (e.g., greater than or equal to) at least one of the UE cellular network and/or services identifier(s) 112 a network. In additional or alternative examples, a carrier configuration identifier 110 (e.g., a carrier configuration identifier 110 of a 5G network) being received can be set to have a priority that is different from (e.g., greater than) a UE cellular network and/or services identifier 112 (e.g., a UE cellular network and/or services identifier 112 of an LTE network) being identified. In additional or alternative examples, a UE receiving the carrier configuration identifier 110 can be automatically switched to the 5G network based on the priority.

Although a network (e.g., a 5G network, an LTE network, etc.) and/or one or more settings (e.g., one or more data communication settings, one or more voice communication settings, etc.) can be automatically switched for the UE receiving the carrier configuration identifier 110 utilizing the override setting(s) based on i) the carrier configuration identifier 110 having the relatively greater priority than the UE cellular network and/or services identifier 112, and ii) the carrier configuration identifier 110 (e.g., the carrier configuration identifier 110 of the 5G network) being received (e.g., notwithstanding the UE cellular network and/or services identifier 112 (e.g., the UE cellular network and/or services identifier 112 of the LTE network) being identified), as discussed above in the current disclosure, it is not limited as such. Any of the override setting(s) associated with the priority(ies) can be associated with any of the cellular network and/or services data 104 (e.g., carrier configuration identifier(s) 110, the UE cellular network and/or services identifier(s) 112, the cellular network(s), the service(s), the service type(s), the cellular setting(s), the network setting(s), the service setting(s), the service type setting(s), the presentation setting(s), the software setting(s), etc.).

In some examples, a network (e.g., a 5G network, an LTE network, etc.) and/or one or more settings (e.g., one or more data communication settings, one or more voice communication settings, etc.) for a UE can be automatically switched based on i) a UE cellular network and/or services identifier 112 being set to have a relatively greater priority than a carrier configuration identifier 110, and ii) a UE cellular network and/or services identifier 112 (e.g., a UE cellular network and/or services identifier 112 of an LTE network) being identified (e.g., notwithstanding a carrier configuration identifier 110 (e.g., a carrier configuration identifier 110 of the 5G network) being received).

In some examples, for instance with the override setting(s) being associated with the carrier configuration identifier(s) 110 and/or the UE cellular network and/or services identifier(s) 112, the override setting(s) can be utilized to set at least one of the carrier configuration identifier(s) 110 of a network or service type to have a priority that is different from (e.g., greater than or equal to) at least one of the UE cellular network and/or services identifier(s) 112 of a service type. In additional or alternative examples, a carrier configuration identifier 110 (e.g., a carrier configuration identifier 110 of a network or service type being for at least one network or at least one service (e.g., voice service)) being received can be set to have a priority that is different from (e.g., greater than) a UE cellular network and/or services identifier 112 (e.g., a UE cellular network and/or services identifier 112 of a network or service type for at least one data service) being identified, selected, and/or modified. In additional or alternative examples, a UE receiving the carrier configuration identifier 110 can be automatically enabled to utilize the voice service(s) (e.g., at least one voice service of any type, such as VoNR service(s) for cases in which the VoNR service(s) are currently being used by the UE), along with the corresponding data service(s) (e.g., at least one data service of any type, such as 5G service(s)) required for the voice service(s) notwithstanding the UE cellular network and/or services identifier 112 being identified, selected, and/or modified.

Although the override setting(s) can be utilized to set the at least one of the carrier configuration identifier(s) 110 of a network or service type to have the priority that is different from (e.g., greater than or equal to) the at least one of the UE cellular network and/or services identifier(s) 112 of the network or service type, as discussed above in the current disclosure, it is not limited as such. By way of example, a UE cellular network and/or services identifier 112 (e.g., a UE cellular network and/or services identifier 112 of a network or service type for at least one service (e.g., data service or voice service)) being identified, selected, and/or modified can be set to have a priority that is different from (e.g., greater than) a carrier configuration identifier 110 (e.g., a carrier configuration identifier 110 of a network or service type for at least one service (e.g., data service or voice service)) being received. In additional or alternative examples, a UE identifying the UE cellular network and/or services identifier 112 can be automatically enabled to utilize the data service(s) (e.g., at least one data service of any type, such as LTE service(s) for cases in which LTE service(s) are currently identified by the cellular data management system 102 as being available for use by the UE), along with the corresponding voice service(s) (e.g., at least one voice service of any type, such as VoLTE service(s)) that is usable via the data service(s), notwithstanding the carrier configuration identifier 110 being received.

In some examples, a network (e.g., an LTE network) and/or one or more settings (e.g., one or more data communication settings, one or more voice communication settings, etc.) for a UE can be controlled based on an absence (e.g., a non-existence) of any UE priorities and/or any carrier configuration priorities. By way of example, for instance with an absence of any UE priorities and any carrier configuration priorities, the network and/or the setting(s) (e.g., one or more data communication settings, one or more voice communication settings, etc.) can be updated based on i) one or more selections via user input to the UE 108 being identified, selected, and/or modified at a time (e.g., a first time), and/or ii) one or more carrier configuration settings being received by the UE 108 at another time (e.g., a second time).

Although the environment 100 can include the base station(s) 106, as discussed above in the current disclosure, it is not limited as such. In some examples, individual ones of the base station(s) 106 can include a gNodeB (e.g., a 5G gNodeB (or "gNB"), an eNodeB (e.g., a 4G eNodeB) (or "eNB"), a NodeB (e.g., a 3G universal mobile telecommunications system (UMTS) NodeB), or any other type of base station.

The base station(s) 106 (or "cell site(s)") (or "cell tower(s)") can be associated with antennae and/or other electronic communications equipment (e.g., transceivers, digital signal processors, control electronics, a GPS receiver, etc.) to create a cell in a cellular network. (e.g., any of the network(s) in the environment 100).

The UE(s) 108, which can be operable by users, can be used to perform actions attributed to a "user." Any of the UE(s) 108 can be a computing device such as a smart phone, a personal digital assistant, a netbook, a tablet, a laptop computer, a smart appliance, a wearable device, and/or another electronic device that is capable of transmitting or receiving audio, video, and/or data via the network(s). In at least one example, the UE(s) 108 can communicate with the cellular data management system 102 via the network(s) and/or the base station(s) 106.

Although toggle(s) are utilized by the UE(s) 108 as discussed above in the current disclosure, it is not limited as such. Any type of indicator(s), including the toggles, or any other type of indicators (e.g., radio buttons, drop down links, checkboxes, text input boxes, etc.) can be managed similarly to the toggles for any techniques as discussed herein.

Although carrier configuration identifier(s) 110 of a default setting for VoNR and/or a toggle display setting can be utilized to override UE cellular network and/or services identifier(s) 112 of a setting for VoNR and/or a toggle display setting, as discussed above in the current disclosure, it is not limited as such. In some examples, a carrier configuration identifier 110 of a default setting for VoNR being on can be utilized to override UE cellular network and/or services identifiers 112 of both a setting for VoNR being off, and of a setting for 5G being off (e.g., since 5G is required for VoNR); and/or a carrier configuration identifier 110 of a toggle display setting can be utilized to override UE cellular network and/or services identifiers 112 of both a toggle display setting for VoNR and of a toggle display setting of 5G.

In those or other examples, the carrier configuration for the VoNR setting being on can be utilized to set VoNR on and 5G on; or the carrier configuration for the VoNR setting being off can be utilized to set VoNR off and 5G off. In those or other examples, the carrier configuration for the VoNR toggle being visible can be utilized to make both the VoNR toggle and the 5G toggle visible; or the carrier configuration for the VoNR toggle being hidden can be utilized to make both the VoNR toggle and the 5G toggle hidden.

In those or other examples, the carrier configuration for the 5G setting being on can be utilized to set VoNR on and 5G on; or the carrier configuration for the 5G setting being off can be utilized to set VoNR off and 5G off. In those or other examples, the carrier configuration for the 5G toggle being visible can be utilized to make both the VoNR toggle and the 5G toggle visible; or the carrier configuration for the 5G toggle being hidden can be utilized to make both the VoNR toggle and the 5G toggle hidden.

Therefore, and as described herein, various types of network and/or services selections can be performed based on data from devices of various parties, including service providers and users. A user can select a type of network and/or services (e.g., a type of voice service) for a UE by selecting toggle buttons of a UI, such as a touch display, of the UE. For example, the user can select a 5G network and VoNR. A service provider can select a type of network and services (e.g., a type of voice service) for the UE by determining carrier configuration data and transmitting the carrier configuration data to the UE.

Further, as described herein, the toggle buttons can be displayed on the touch display and controlled based on user selections via the user selecting the toggle buttons, and/or based on the carrier configuration data. UE cellular network and/or services identifiers 112 can be identified based on the user selections and the carrier configuration identifiers 110 can be identified based on the carrier configuration data. The UE cellular network and/or services identifiers 112 and/or the carrier configuration identifiers 110 can be utilized to set, and/or to modify, the toggle buttons, how the toggle buttons are displayed, and/or whether the toggle buttons are displayed. The toggle buttons can be displayed as being set to on or off based on values of corresponding UE cellular network and/or services identifiers 112, and/or based on values of corresponding carrier configuration identifiers 110. For example, a 5G toggle button can be displayed as being on based on a UE cellular network and/or services identifier 112 of the 5G network having a value of true; and a VoNR toggle button can be displayed as being on based on a UE cellular network and/or services identifier 112 of the VoNR having a value of true.

Further, as described herein, override data can be utilized to control any of the data utilized for management of the network and/or services selections. The override data can include override settings utilized to establish a priority level of the service provider data with respect to the network and/or services selections over a priority level of the UE (e.g., the user) with respect to the network and/or services selections. For example, an override setting for the service provider with respect to a type of network or service can enable the service provider to control the 5G toggle button to be changed to on notwithstanding a previous network and/or service selection by the user being used to turn the 5G toggle button to be off. In such an example or other examples, an override setting for the service provider with respect to a type of network or service can enable the service provider to control the VoNR toggle button to be changed to on notwithstanding a previous network and/or service selection by the user being used to set the VoNR toggle button to be off. The service provider can control the 5G toggle button and VoNR toggle button to be changed to on based on the override settings by transmitting the carrier configuration identifiers 110 of the 5G network and VoNR to the UE, with values of the carrier configuration identifiers 110 being true.

Further, as described herein, presentation data can be utilized to control how the toggle buttons are presented by the touch display of the UE. For example, presentation settings can be transmitted, via carrier configuration identifiers 110 of the presentation settings, to cause the VoNR toggle button to be disabled or hidden in such instances in which the 5G toggle button is set to off. Hiding indicator(s) can include the UE(s) 108 refraining from displaying the indicator(s).

FIG. 2 is a diagram illustrating example user equipment (UE) user interface (UI) screens for selecting cellular networks and/or services associated with a UE 202, as described herein. In some examples, the UE 202 can be utilized to implement any of the UE(s) 108 as discussed above with reference to FIG. 1.

As illustrated, the UE 202 can present, via a user interface (e.g., a touch display), a wireless settings menu screen 204. In some examples, the wireless settings menu screen 204 can include one or more indicators associated with one or more wireless settings (e.g., one or more settings for wi-fi, wi-fi calling, bluetooth, near field communication (NFC) and payment, airplane mode, mobile networks, data usage, mobile hotpot, and tethering, etc.). The indicator(s) in the wireless settings menu screen 204 can include a networks indicator (or "a mobile networks indicator") 206. The networks indicator 206 being selected via user input to the UE 202, such as a touch input to the networks indicator 206, can be utilized to present (or "display") data (e.g., one or more indicators) associated with one or more mobile networks, one or more mobile network services (or "network service(s)"), and/or one or more settings for the mobile networks.

A mobile networks screen 208 can be presented via the UE 202 based on user input received to the UE 202 to select the networks indicator 206, during presentation of the wireless settings menu screen 204. The mobile networks screen 208 can include data, such as one or more portions of text, one or more indicators, one or more toggle indicators (e.g., one or more toggle buttons) (or "toggle(s)"), etc., associated with the mobile network(s), the network service(s), and/or the setting(s). The data can include text associated with allowing a fifth generation (5G) network and/or service, using voice over new radio (VoNR), how the VoNR is used (e.g., text indicating that 5G the VoNR uses 5G networks for calls whenever possible), allowing a second generation (2G) network and/or service, and other data (e.g., accessing point names, network operators, etc.). In some examples, the toggle(s) can include a 5G toggle 210, a VoNR toggle 212, a 2G toggle 214, and so on.

In some examples, one or more default values (or "default(s)") of at least one of the toggle(s) in the mobile networks screen can include the at least one of the toggle(s) being set to on (e.g., the default value(s) can be on). The default value(s) can be determined by data (e.g., the carrier configuration identifier(s) 110), data (e.g., the UE cellular network and/or services identifier(s) 112) identified by the UE 202, or a combination thereof.

By way of example, at least one of the carrier configuration identifier(s) 110 and/or the UE cellular network and/or services identifier(s) 112 associated with at least one default value for 5G service, VoNR service, and/or 2G service can be utilized as the default value(s). In such an example or other examples, the at least one of the carrier configuration identifier(s) 110 and/or the UE cellular network and/or services identifier(s) 112 being utilized as the at least one default value for 5G service, VoNR service, and/or 2G service can be identified based on override data (e.g., data includes in the override data as discussed above with reference to FIG. 1).

For instance, with examples in which the override data indicates at least one priority associated with the at least one of the carrier configuration identifier(s) 110 of the at least one default value being greater than at least one priority associated with the UE cellular network and/or services identifier(s) 112 of the at least one default value, at least one of the 5G toggle 210, the VoNR toggle 212, and the 2G toggle 214 can be set as the at lest one default value with which the at least one of the carrier configuration identifier(s) 110 is associated (e.g., the 5G toggle 210, the VoNR toggle 212, and the 2G toggle 214 can be set to true based on the at least one default value indicated by the carrier configuration identifier(s) 110 received from the service provider, the carrier configuration identifier(s) 110 including at least one true value for at least one of the 5G service, the VoNR service, and the 2G service).

The 2G toggle 214 can be implemented in a similar way as the 5G toggle 210, except with the 2G toggle 214 enabling the UE 202 to use 2G services via a 2G network instead of 5G services via a 5G network. In some examples, the cellular data management system 102 and/or the UE 202 can control the 5G toggle 210 and the 2G toggle 214 to be interconnected, so that toggling off the 5G toggle 210 is used to automatically toggle on the 2G toggle 214. In some examples, the 5G toggle 210 and the 2G toggle 214 are controlled independently, so that toggling the 5G toggle 210 and/or the 2G toggle 214 on or off is not used to toggle the other one.

The UE 202 can present, via the UI, mobile networks screens 218, 220, and 222. In some examples, the mobile networks screens 218, 220, and 222 can be implemented in a similar way as the mobile networks screen 208, except with at least one value of the toggle(s) in the mobile networks screens 218, 220, and 222 being the same as, or different from, at least one value of the toggle(s) in the mobile networks screen 208. For example, individual ones of the mobile networks screen 208, and the mobile networks screens 218, 220, and 222, can be associated with a point in time (e.g., subsequent points of time, respectively) and/or at least one cellular data value (e.g., at least one value based on the carrier configuration data and/or the UE cellular network and/or services data), being different from a point in time and/or at least one user cellular data value (e.g., at least one value based on the carrier configuration data and/or the UE cellular network and/or services data), with which any other of the others, is associated.

In some examples, the mobile networks screen 218 can be associated with a VoNR value of the VoNR toggle 212 being off instead of on, as in the mobile networks screen 208. For instance, with examples in which a user selection is received via user input (e.g., a touch) to the VoNR toggle 212, the VoNR toggle 212 can be switched off. Alternatively or additionally, for instance, with examples in which a carrier configuration indicator (e.g., one of the carrier configuration identifier(s) 110) of VoNR is received by the UE 202 and from the cellular data management system 102, the VoNR toggle 212 can be switched off based on the carrier configuration indicator of VoNR having a value of false.

In some examples, the mobile networks screen 220 can be associated with a VoNR toggle presentation setting. For instance, with examples in which the VoNR toggle presentation setting has a value associated with hiding the VoNR toggle 212, the VoNR toggle 212 can be hidden. In alternative or additional examples, the VoNR toggle presentation setting can be identified based on a carrier configuration identifier 110 or a UE cellular network and/or services identifier 112. In those or other examples, the carrier configuration identifier 110 of the VoNR toggle presentation setting can override the UE cellular network and/or services identifier 112 of the VoNR toggle presentation setting, based on override setting received from the cellular data management system indicating a priority of the carrier configuration identifier 110 being greater than a priority of the UE cellular network and/or services identifier 112 of the VoNR toggle presentation setting (e.g., the service provider can cause the VoNR toggle 212 to be hidden notwithstanding a UE setting being associated with the VoNR toggle 212 being visible.

In some examples, the mobile networks screen 222 can be associated with the VoNR toggle presentation setting, as discussed above for the mobile networks screen 220, as well as a 5G toggle presentation setting. In those or other examples, the 5G toggle presentation setting can be implemented in a similar way as for the VoNR toggle presentation setting.

Although the UE 202 can display the 5G toggle 210, the VoNR toggle 212, and the 2G toggle 214, as discussed above in the current disclosure, it is not limited as such. In some examples, one or more of the 5G toggle 210, the VoNR toggle 212, and the 2G toggle 214 can be omitted and not used to control any services for the UE 202. In some examples, one or more of the 5G toggle 210, the VoNR toggle 212, and the 2G toggle 214 can be hidden and/or deactivated based on data of the cellular data management system 102 and/or the UE 202.

In some examples, any number of any other types of toggles associated with any other type of network (e.g., a past, present, or future network, data service, and/or voice service) can be utilized, alternatively or in addition to, one or more of the 5G toggle 210, the VoNR toggle 212, and the 2G toggle 214. By way of example, any generation of network toggle and voice toggle can be used instead of the 5G toggle 210 and the VoNR toggle 212, in a similar way as the 5G toggle 210 and the VoNR toggle 212, respectively. In such an example or other examples, the 2G toggle 214 can be replaced by, and/or used along with, the 5G toggle 210, which can be operated similarly to the 2G toggle 214 (e.g., in such cases of the 2G toggle 214 being replaced by the 5G toggle 210).

Therefore, and as described herein, various types of data can be utilized to display indicators (e.g., toggles) in a mobile networks screen. Any of the toggles displayed by the mobile networks screen can have values of on or off based on service provider data and/or UE data. Any of the toggles can also be visible or hidden, based on the service provider data (e.g., carrier configuration data) and/or the UE data (e.g., UE cellular network and/or services data).

Further, as described herein, cellular network and/or services settings (e.g., carrier configuration VoNR default settings, carrier configuration VoNR display settings, etc.) can be utilized to assign priorities to carrier configurations (e.g., carrier configuration data) over priorities of UE data and/or user selections. In some cases, the UE 202 can automatically process the carrier configurations (e.g., the carrier configuration identifier(s) 110) as having higher priorities than the UE data (e.g., the UE cellular network and/or services identifier(s) 112).

In other cases, the cellular data management system 102 can transmit override settings, separately from and/or along with (e.g., integrated with), the cellular network and/or services settings. The UE 202 can utilize the override settings and/or priorities included in the override settings, to identify whether the carrier configurations have higher priorities than the UE data. The override settings and/or priorities identifying that the carrier configurations have higher priorities than the UE data can be received and identified by the UE 202 to utilize the carrier configurations instead of the UE data.

Further, as described herein, carrier configuration identifiers and UE cellular network and/or services identifiers can include values for networks and services (e.g., data services, voice services, etc.). The carrier configuration identifiers (e.g., values, such as for VoNR, of carrier configuration default settings and/or carrier configuration toggle display settings) can be determined by service providers, and the UE cellular network and/or services identifiers (e.g., values of toggles, such as for a 5G network, VoNR, a 2G network) can be determined by UEs or user selections. The carrier configuration identifiers can override the UE carrier configuration identifiers.

Further, as described herein, the UEs can utilize the UE settings or the carrier configurations for determining which types of networks or cellular services to use (e.g., for determining network and/or service selections). The UEs can use the carrier configurations if they are received, instead of the UE settings. The service provider can route communications for the UEs based on the network and/or service selections.

FIGS. 3A and 3B are a diagrams illustrating example user equipment (UE) user interface (UI) screens for selecting cellular networks and/or services for a UE 302, based on a UE voice over new radio (VoNR) identifier being toggled (or "updated") to be on and then a network service identifier being toggled on, without a carrier configuration VoNR toggle display setting being used, in comparison to the network service identifier being toggled on, with the carrier configuration VoNR toggle display identifier being used and set to true, as described herein. In some examples, the UE 302 can be utilized to implement the UE(s) 108 and/or the UE 202, as discussed above with reference to FIGS. 1 and 2.

Referring to FIG. 3A, in some examples, the UE 302 can be utilized to present a mobile networks screen 304, which can be implemented as the mobile networks screen 208. In those or other examples, the mobile networks screen 304 can include one or more indicators (e.g., one or more toggles), including a fifth generation (5G) toggle 306, a voice over new radio (VoNR) toggle 308, and a second generation (2G) toggle 310, which can be implemented in a similar way as for the 5G toggle 210, the VoNR toggle 212, and the 2G toggle 214, respectively. The UE 302 can be utilized to present the mobile networks screen 304, and mobile networks screens 312 and 316, which can be associated with different points in time (e.g., subsequent points of time, respectively) and/or different cellular data values (e.g., values included in, and/or based on, the carrier configuration data and/or the UE cellular network and/or services data) with respect to any of the others. By way of example, the mobile networks screens 304, 312, and 316 can be associated with a time at which the carrier configuration VoNR default setting 322 and the carrier confirmation VoNR toggle display setting 324, as discussed below, have not been received and/or are non-existent.

In some instances, such as with examples in which the mobile networks screen 304 is displayed prior to any and/or all of carrier configuration data (e.g., the carrier configuration identifiers 110) being received (e.g., prior to the carrier configuration VoNR default setting 322 and the carrier confirmation VoNR toggle display setting 324, as discussed below, being set), the UE 302 can identify a user selection in the mobile networks screen 304 via user input to switch the 5G toggle 306 off, and hide the VoNR toggle 308, based on the user selection.

The UE 302 can control whether the VoNR toggle 308 is hidden or visible in the mobile networks screen 312 based on the value of the 5G toggle 306. The UE 302 can control the VoNR toggle 308 to be hidden in the mobile networks screen 312 because utilization of a VoNR service requires a 5G service, based on the 5G toggle 306 being switched off by the user in the mobile networks screen 304.

Based on the 5G toggle 306 in the mobile networks screen 312 being selected by a user, the UE 302 can be determine to utilize a selection of the 5G toggle 306 to control the VoNR toggle 308 to be visible in the mobile networks screen 316, the 5G toggle 306 being illustrated in the mobile networks screen 312 as a user selected 5G toggle 314 with a "star" to highlight how the user selected 5G toggle 314 and the UE cellular network and/or services identifier(s) 112 can be utilized to control whether the VoNR toggle 408 is hidden or visible. For example, the UE 302 can utilize the user selected 5G toggle 314 to control the VoNR toggle 308 to be visible in the mobile networks screen 316 based on i) a UE setting associated with the VoNR toggle 308 being visible if the 5G toggle 306 is on, ii) the UE cellular network and/or services identifier(s) 112 (e.g., a default UE setting for the VoNR toggle 308 being visible or hidden, and/or a user selected setting for the VoNR toggle 308 being visible or hidden), iii) a carrier configuration VoNR default setting (e.g., the carrier configuration VoNR default setting 322, as discussed below) having not been received, or iv) a combination thereof.

The 5G toggle 306 is referenced as the user selected 5G toggle 314 in the mobile networks screen 312, based on the 5G toggle 306 being selected, for purposes of explanation, to represent a case in which UE setting(s) (e.g., a UE display setting and/or a UE default setting for the VoNR toggle 308) are used to control whether the VoNR toggle 308 is visible, and/or whether there is a default value for the VoNR toggle 308, in the mobile networks screens 304, 312, and/or 316, in comparison to the carrier configuration default setting 322 and the carrier configuration VoNR toggle display setting 324 being used in the mobile networks screens 318, 320, and/or 326, as discussed below.

Referring to FIG. 3B, the UE 302 can be utilized to present, based on, or subsequent to, the mobile networks screen 304, mobile networks screens 318, 320, and 326, which can be associated with different points in time (e.g., subsequent points of time, respectively) and/or different cellular data values (e.g., values included in, and/or based on, the carrier configuration data and/or the UE cellular network and/or services data) with respect to any of the others. In some instances, such as with examples in which the mobile networks screen 318 is displayed prior to any and/or all of carrier configuration data (e.g., the carrier configuration identifiers 110) being received (e.g., prior to the carrier configuration VoNR default setting 322 and the carrier confirmation VoNR toggle display setting 324, as discussed below, being identified), the mobile networks screen 312 can display the 5G toggle 306 being set to off (e.g., switched off by a user) and the 2G toggle 310 being set to on. The mobile networks screen 318 being displayed can omit (e.g., hide) the VoNR toggle 308, based on the 5G toggle 306 being set to "off."

In some examples, the UE 302 can receive, from the cellular data management system 102, at least one of one or more cellular network and/or services settings (e.g., the cellular network and/or services setting(s) as discussed above with reference to FIG. 1). The cellular network and/or services setting(s) can include a carrier configuration VoNR default setting 322 and/or a carrier confirmation VoNR toggle display setting 324.

In some instances, such as for examples in which i) the carrier configuration VoNR default setting 322 is varied, according to any of various options (e.g., having a value of true, having a value of false, being ignored (e.g., received and variable, such as with a value of the carrier configuration VoNR default setting 322 being true, false, or undefined)), or being absent (e.g., non-existent, not set, not received, and/or not generated)), the VoNR toggle 308 can be hidden from the mobile networks screen 320 based on the 5G toggle 306 being set to "off." In those or other examples, the UE 302 can utilize the value of the 5G toggle 306 to determine whether to hide the VoNR toggle 308, based on the carrier configuration VoNR default setting 322 being true, false, ignored (e.g., disregarded), or absent. Based on the carrier configuration VoNR default setting 322 being true, false, ignored (e.g., the UE 302 receives the carrier configuration VoNR default setting 322 with some value but ignores/disregards the carrier configuration VoNR default setting 322), or absent (e.g., the UE 302 does not receive any carrier configuration VoNR default setting), the UE 302 can utilize user selections (e.g., a UE cellular network and/or services identifier 112 that is associated with the 5G toggle 306 having a value of true or false, based on user input) to control the VoNR toggle 308 to be on or off. The VoNR toggle 308 being set to "on" in the mobile networks screen 304, at time prior to a time associated with the mobile networks screen 318, of can be utilized to identify the VoNR toggle 308 as being on, but hidden, in the mobile networks screen 320, based on i) the carrier configuration VoNR default setting 322 being true, false, ignored, or absent, which results in a priority of the UE set value of the VoNR toggle 308 being greater than a priority of the carrier configuration data (e.g., the carrier configuration VoNR default setting 322).

In some instances, such as for examples in which the carrier configuration VoNR toggle display setting 324 is set to true, the VoNR toggle 308 can be controlled to be visible and set to "on" the mobile networks screen 326 based on i) the VoNR toggle 308 being set to "on" in the mobile networks screen 304 (e.g., via the UE default setting and/or the user selection), and ii) the 5G toggle 306 being selected in the mobile networks screen 320 to be turned on (e.g., the true, false, ignored, or absent carrier confirmation VoNR default setting 322 does not control the value of the VoNR toggle 308; and the carrier configuration VoNR toggle display setting 324 controls visibility of the VoNR toggle 308). By way of example, the carrier configuration VoNR toggle display setting 324 can be used to control the VoNR toggle 308 to be visible in the mobile networks screen 326 (e.g., in comparison to the UE default setting and/or the user selected setting being used to control the VoNR toggle 308 to be visible in the mobile networks screen 316). Based on the carrier configuration VoNR default setting 322 being true, false, ignored, or absent, the UE 302 can utilize the 5G toggle 306 being on (e.g., a UE cellular network and/or services identifier 112 that is associated with the 5G toggle 506 having a value of true) to control the VoNR toggle 308 to be visible in the mobile networks screen 326.

Although the carrier configuration VoNR default setting 322 and the carrier configuration VoNR toggle display setting 324 can be transmitted to the UE 302, as discussed above in the current disclosure, it is not limited as such. In some examples, any number of any type of carrier configuration default settings (e.g., on or off status, availability, time duration, enabled/disabled status, hidden/visible status, etc.) associated with any service (e.g., a voice service, a data service, etc., of any type) can be implemented and/or utilized in a similar way as the carrier configuration VoNR default setting 322. For example, a carrier configuration default setting can indicate whether an indicator is on or off, whether an indicator is disabled, whether an indicator is hidden or visible, how long the any of default settings are to remain for the indicators, etc.

In those or other examples, any number of any type of carrier configuration toggle display settings (e.g., settings for blinking, size, dotted and/or solid lines, patterns, colors, brightness, etc.) associated with any service (e.g., a voice service, a data service, etc., of any type) can be implemented and/or utilized in a similar way as the carrier configuration VoNR toggle display setting 324 for any of the techniques discussed herein.

FIGS. 4A and 4B are diagrams illustrating example user equipment (UE) user interface (UI) screens as illustrated above in FIG. 3, except with a UE voice over new radio (VoNR) identifier being disabled instead of hidden, as described herein. In some examples, a UE 402 can be utilized to implement the UE(s) 108, the UE 202, and/or the UE 302, as discussed above with reference to FIGS. 1-3.

Referring to FIG. 4A, in some examples, the UE 402 can be utilized to display a mobile networks screen 404, which can include one or more indicators (e.g., one or more toggles), including a fifth generation (5G) toggle 406, a voice over new radio toggle (VoNR) 408, and a second generation (2G) toggle 410, which can be implemented in a similar way as the 5G toggle 210, the VoNR toggle 212, and the 2G toggle 214, respectively. In those or other examples, the UE 402 can be utilized to display the mobile networks screen 404, and mobile networks screens 412 and 418, which can be associated with different points in time (e.g., subsequent points of time, respectively) and/or different cellular data values (e.g., values included in, and/or based on, the carrier configuration data and/or the UE cellular network and/or services data) with respect to one another and/or the mobile networks screen 404.

The mobile networks screen 412 can include, based on the 5G toggle 406 being selected in the mobile networks screen 404 to be turned off, a disabled VoNR toggle 416. The 5G toggle 406 being turned off in the mobile networks screen 404 can be used to change the VoNR toggle 408 in the mobile networks screen 404 to the disabled VoNR toggle 416 in the mobile networks screen 412.

The mobile networks screen 412 can include the 5G toggle 406 being selected by a user in the mobile networks screen 412, as a user selected 5G toggle 414, which is illustrated with a "star" to highlight how a UE default setting and/or a user selected setting, and the value in the mobile networks screen 404 of the VoNR toggle 408, can be utilized to control the VoNR toggle 408 to be on in the mobile networks screen 418 (e.g., based on the VoNR toggle 408 being enabled by the user selected 5G toggle 414). The UE 402 determines to utilize the UE default setting and/or a user selected setting to control the value of the VoNR toggle 408 in the mobile networks screen 418, based on an absence of carrier configuration data being received from the cellular data management system 102 (e.g., the carrier configuration data not being received and/or being non-existent).

The 5G toggle 406 is referenced as the user selected 5G toggle 414 in the mobile networks screen 412, based on the 5G toggle 406 being selected, for purposes of explanation, to represent a case in which UE setting(s) (e.g., a UE display setting and/or a UE default setting for the VoNR toggle 408) are used to control whether the VoNR toggle 408 is visible, and/or whether there is a default value for the VoNR toggle 406, in the mobile networks screens 404, 412, and/or 418, in comparison to the carrier configuration default setting 322 and the carrier configuration VoNR toggle display setting 324 being used in the mobile networks screens 420, 422, and/or 424, as discussed below.

Referring to FIG. 4B, in some examples, the UE 402 can be utilized to display, based on, or subsequent to the mobile networks screen 404, mobile networks screens 420, 422, and 424. The mobile networks screen 404, and the mobile networks screens 420, 422, and 424, can be associated with different points in time (e.g., subsequent points of time, respectively) and/or different cellular data values (e.g., values included in, and/or based on, the carrier configuration data and/or the UE cellular network and/or services data) with respect to any of the others. The 5G toggle 406, the VoNR toggle 408, and the 2G toggle 410 as illustrated in FIG. 4B can be the same as (e.g., have the same value as, and/or be operated in the same way as) the 5G toggle 306, the VoNR toggle 308, and the 2G toggle 310, respectively, as discussed above with reference to FIG. 3.

In some examples, the mobile networks screen 420 can display the 5G toggle 406 being off, based on the 5G toggle 406 in the mobile networks screen 404 being toggled (e.g., switched off) by the user. In a similar way as for the mobile networks screen 412, the mobile networks screen 420 can include, based on the 5G toggle 406 in the mobile networks screen 404 being turned off, a disabled VoNR toggle 416 in the mobile networks screen 420. The VoNR toggle 408 in the mobile networks screen 404 being selected to be disabled can be displayed as the disabled VoNR toggle 416 in the mobile networks screen 420.

In some examples, the UE 402, controlling the mobile networks screen 422 to include the disabled VoNR toggle 416, can receive one or more cellular network and/or services settings, including a carrier configuration VoNR default setting 322 and/or a carrier confirmation VoNR toggle display setting 324. The UE 402 can control the disabled VoNR toggle 416 in the mobile networks screen 422 in a similar way as for the VoNR toggle 308 in the mobile networks screen 326, except with the disabled VoNR toggle 416 being included in the mobile networks screen 422, instead of the VoNR toggle 308 being hidden as in the mobile networks screen 320.

In some examples, the UE 402 can control the mobile networks screen 424 to include the VoNR toggle 408 being on, based on the 5G toggle 408 being set to "on" in the mobile networks screen 404 (e.g., the carrier configuration VoNR default setting 322 being any of various options (e.g., true, false, ignored (e.g., received and variable, such as being set with a value of the VoNR default setting 322 being true, false, or being undefined (e.g., not set); but, disregarded), or absent) has a relatively lower priority than the UE default value and/or the user selection). The UE 402 can control the VoNR toggle 408 in the mobile networks screen 424 in a similar way as for the VoNR toggle 308 in the mobile networks screen 326, with the VoNR toggle 408 being on in the mobile networks screen 424. Similar to how the VoNR toggle 308 is controlled in the mobile networks screen 326, the UE 402 can control the VoNR toggle 408 to be visible, based on the carrier configuration VoNR toggle display setting 324 being true, regardless of values of the UE data (e.g., whether the VoNR toggle 308 is visible or hidden can be controlled based on the carrier configuration VoNR toggle display setting 324 having a relatively higher priority than the UE data).

Figure 5:
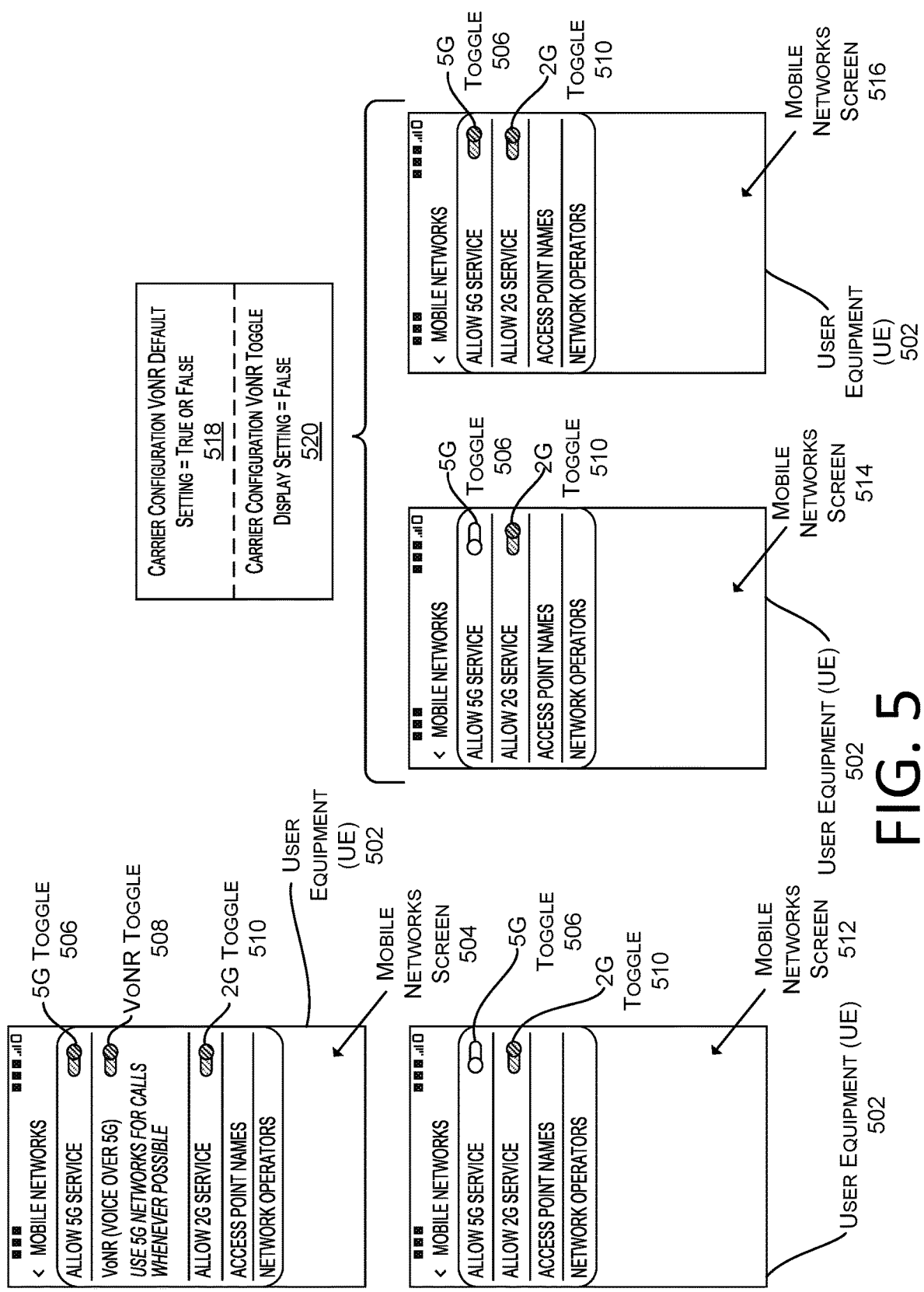
FIG. 5 is a diagram illustrating example user equipment (UE) user interface (UI) screens for selecting cellular networks and/or services for a UE, based on a UE voice over new radio (VoNR) identifier being toggled on and then hidden, a VoNR default identifier being set to true or false, and a VoNR toggle display identifier being set to false, as described herein.

FIG. 5 is a diagram illustrating example user equipment (UE) user interface (UI) screens for selecting cellular networks and/or services for a UE, based on a UE voice over new radio (VoNR) identifier being toggled on and then hidden, a VoNR default identifier being set to true or false, and a VoNR toggle display identifier being set to false, as described herein. In some examples, the UE 502 can be utilized to implement any of the UE(s) 108 as discussed above with reference to FIG. 1.

In some examples, a UE 502 can be utilized to display a mobile networks screen 504, which can include one or more indicators (e.g., one or more toggles), including a fifth generation (5G) toggle 506, a voice over new radio (VoNR) toggle 508, and a second generation (2G) toggle 510, which can be implemented in a similar way as the 5G toggle 210, the VoNR toggle 212, and the 2G toggle 214, respectively. In those or other examples, the UE 502 can be utilized to display the mobile networks screen 504, and mobile networks screens 512, 514, and 516, which can be associated with different points in time and/or different cellular data values (e.g., values included in, and/or based on, the carrier configuration data and/or the UE cellular network and/or services data) with respect to any of the others.

In some examples, at least one initial value and/or at least one user selected value (e.g., at least one previous user selected value) of at least one of the toggle(s) (e.g., the 5G toggle 506, the VoNR toggle 508, and the 2G toggle 510) in the mobile networks screen 504 can be on (or "triggered"). The UE 502 can control, based on the 5G toggle 506 in the mobile networks screen 504 being selected by a user to be turned from on to off, the VoNR toggle 508 to be hidden in the mobile networks screen 512 and the mobile networks screen 514. The VoNR toggle 508 can be hidden based on a 5G service being turned off, and a VoNR service being unavailable as a result of the 5G service being turned off.

In some examples, the UE 502 displaying the mobile networks screen 514 (e.g., the mobile networks screen 514, for example, being the same as the mobile networks screen 512, except at same or subsequent point in time) can receive, from the cellular data management system 102, at least one of one or more cellular network and/or services settings (e.g., the cellular network and/or services setting(s) as discussed above with reference to FIG. 1). The cellular network and/or services setting(s) can include a carrier configuration VoNR default setting 518 and/or a carrier confirmation VoNR toggle display setting 520.

In some instances, such as for examples in which the carrier configuration VoNR default setting 518 is received and set to true or false, the VoNR toggle 508 can be hidden in the mobile networks screen 516 based on the carrier confirmation VoNR toggle display setting 520 being set to false (e.g., the carrier confirmation VoNR toggle display setting 520 can be utilized to determine whether the VoNR toggle 508 is visible or hidden, based on the carrier confirmation VoNR toggle display setting 520 having a priority that is greater than a UE default setting and/or a user selected setting for the whether the VoNR toggle 508 is visible or hidden).

The VoNR toggle 508 can be hidden in the mobile networks screen 516 notwithstanding the 5G toggle 506 being selected in the mobile networks screen 514 being switched from off to on. The value of the VoNR toggle 508 being hidden can be set to be "on" for cases in which the carrier configuration VoNR default setting 518 is set to true; or the value of the VoNR toggle 508 being hidden can be set to be "off" for cases in which the carrier configuration VoNR default setting 518 is set to false. The value of the VoNR toggle 508 can be set based on the carrier configuration VoNR default setting 518 being defined (e.g., on or off), regardless of the UE default setting and/or the user selected setting for turning on or off the VoNR toggle 508.

Figure 6:
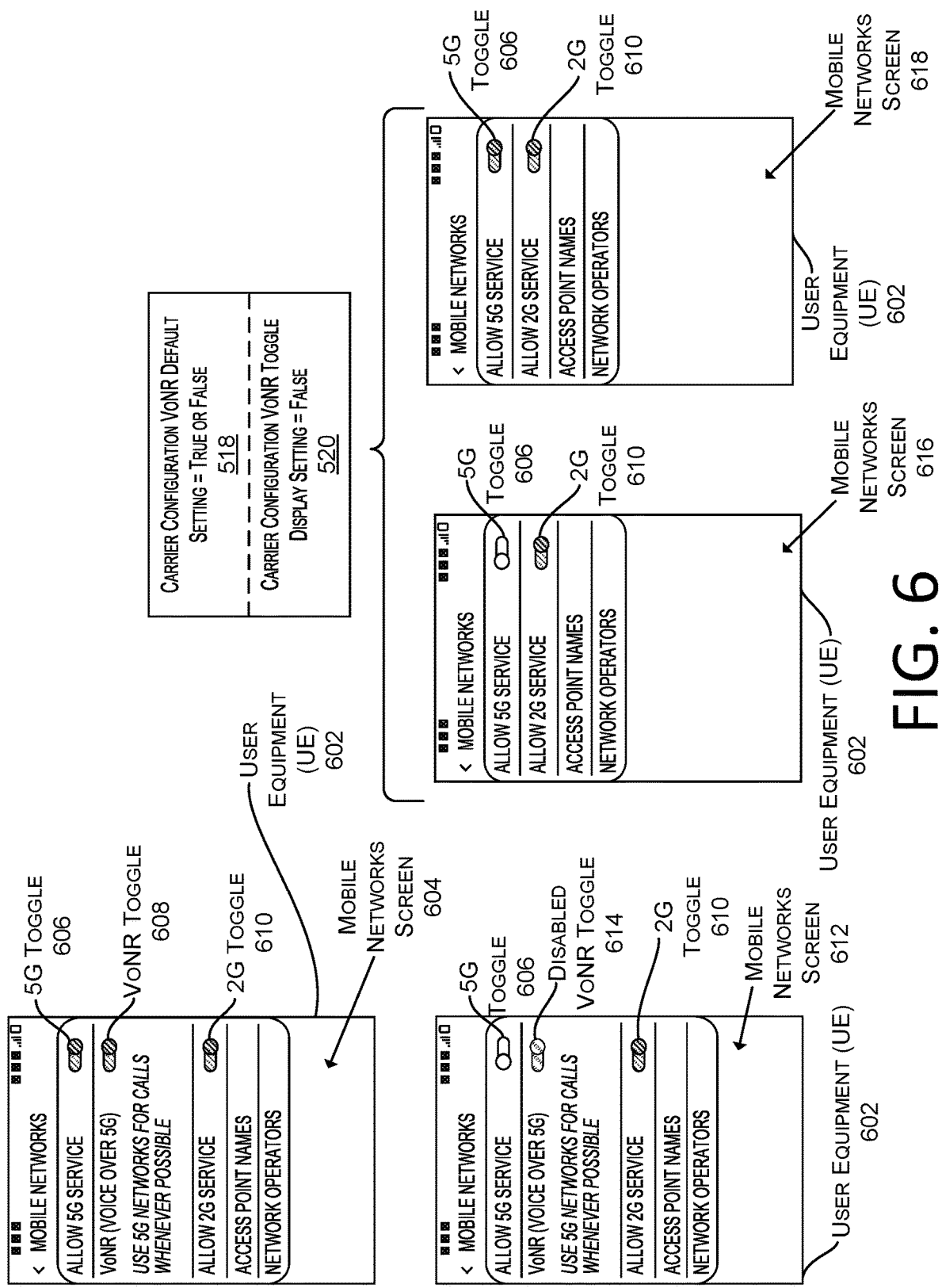
FIG. 6 is a diagram illustrating example user equipment (UE) user interface (UI) as illustrated above in FIG. 5, except with a UE voice over new radio (VoNR) identifier being disabled instead of hidden, as described herein.

FIG. 6 is a diagram illustrating example user equipment (UE) user interface (UI) as illustrated above in FIG. 5, except with a UE voice over new radio (VoNR) identifier being disabled instead of hidden, as described herein. In some examples, a UE 602 can be utilized to display a mobile networks screen 604, which can include one or more indicators (e.g., one or more toggles), including a fifth generation (5G) toggle 606, a voice over new radio (VoNR) toggle 608, and a second generation (2G) toggle 610, which can be the same as (e.g., have the same values as, be operated in the same way as) the 5G toggle 506, the VoNR toggle 508, and the 2G toggle 510, respectively.

In some examples, the UE 202 can be utilized to implement any of the UE(s) 108 as discussed above with reference to FIG. 1. In those or other examples, the UE 602 can be utilized to display the mobile networks screen 604, and mobile networks screens 612, 616, and 618, which can be associated with different points in time and/or different cellular data values (e.g., values included in, and/or based on, the carrier configuration data and/or the UE cellular network and/or services data) with respect to any of the others.

In some examples, the mobile networks screens 604, 612, 616, and 618, can be controlled in a similar way as for the mobile networks screens 504, 512, 514, and 516, respectively, except with the VoNR toggle 608 being included as a disabled VoNR toggle 614 in the mobile networks screen 612, instead of the VoNR toggle 508 being hidden in the mobile networks screen 512. In those or other examples, the mobile networks screen 616 can display the 5G toggle 606 being off, based on the 5G toggle 606 in the mobile networks screen 604 being toggled (e.g., switched off) by the user. In a similar way as for the mobile networks screen 514, the mobile networks screen 616 can include, based on the 5G toggle 606 in the mobile networks screen 604 being turned off, a VoNR toggle 608 that is disabled in the mobile networks screen 612.

In some examples, the UE 602 can receive one or more cellular network and/or services settings, including the carrier configuration VoNR default setting 518 being set to true or false, and/or the carrier confirmation VoNR toggle display setting 520 being set to false. The UE 602 can control the disabled VoNR toggle 614 to be hidden in the mobile networks screen 616 based on the carrier confirmation VoNR toggle display setting 520 being received and set to false.

Figure 7:
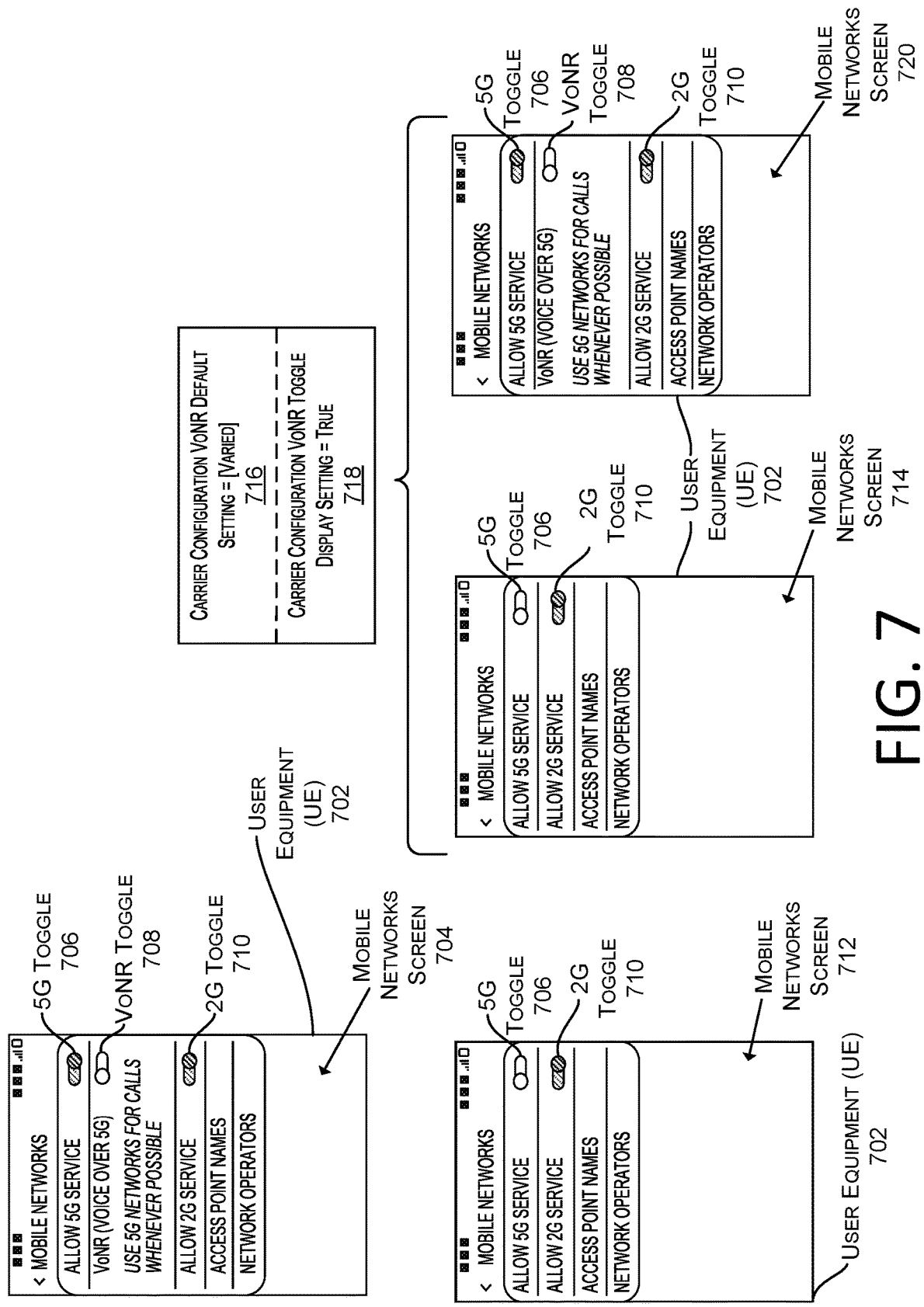
FIG. 7 is a diagram illustrating example user equipment (UE) user interface (UI) screens for selecting cellular networks and/or services for a UE, based on a UE voice over new radio (VoNR) identifier being toggled off and then hidden, a VoNR default identifier being varied, and a VoNR toggle display identifier being set to true, as described herein.

FIG. 7 is a diagram illustrating example user equipment (UE) user interface (UI) screens for selecting cellular networks and/or services for a UE, based on a UE voice over new radio (VoNR) identifier being toggled off and then hidden, a VoNR default identifier being varied, and a VoNR toggle display identifier being set to true, as described herein. In some examples, a UE 702 can be utilized to display a mobile networks screen 704, which can include one or more indicators (e.g., one or more toggles), including a fifth generation (5G) toggle 706, a voice over new radio (VoNR) toggle 708, and a second generation (2G) toggle 710, which can be implemented in a similar way as the 5G toggle 210, the VoNR toggle 212, and the 2G toggle 214, respectively.

In some examples, the UE 702 can be utilized to implement any of the UE(s) 108 as discussed above with reference to FIG. 1. In those or other examples, the UE 702 can be utilized to display the mobile networks screen 704, and mobile networks screens 712, 714, and 720, which can be associated with different points in time and/or different cellular data values (e.g., values included in, and/or based on, the carrier configuration data and/or the UE cellular network and/or services data) with respect to any of the others.

In some examples, at least one initial value and/or at least one user selected value (e.g., at least one previous user selected value) of at least one of the toggle(s) (e.g., the 5G toggle 706 and the 2G toggle 710) in the mobile networks screen 704 can be on (or "triggered"). In those or other examples, at least one initial value and/or at least one user selected value (e.g., at least one previous user selected value) of at least one of the toggle(s) (e.g., the VoNR toggle 708) in the mobile networks screen 704 can be off (or "untriggered").

The UE 702 can control, based on the 5G toggle 706 in the mobile networks screen 704 being selected by a user to be turned from on to off, the VoNR toggle 708 to be hidden in the mobile networks screen 712 and the mobile networks screen 714. The VoNR toggle 708 can be hidden in the mobile networks screen 712 based on a 5G service being turned off, and a VoNR service being unavailable as a result of the 5G service being turned off.

In some examples, the UE 702 displaying the mobile networks screen 714 (e.g., the mobile networks screen 714, for example, being the same as the mobile networks screen 712, except at a same or subsequent point in time) can receive, from the cellular data management system 102, at least one of one or more cellular network and/or services settings (e.g., the cellular network and/or services setting(s) as discussed above with reference to FIG. 1). The cellular network and/or services setting(s) can include a carrier configuration VoNR default setting 716 and/or a carrier confirmation VoNR toggle display setting 718.

In some instances, such as for examples in which the carrier configuration VoNR default setting 716 is any of various options (e.g., true, false, ignored (e.g., received and variable, such as being set with a value of the VoNR default setting 322 being true, false, or being undefined (e.g., not set); but, disregarded), or absent), the VoNR toggle 708 can be visible as being toggled off in the mobile networks screen 720 based on the 5G toggle 706 having been previously toggled off (e.g., as a result of the carrier confirmation VoNR toggle display setting 718 being true). For example, the carrier confirmation VoNR toggle display setting 718 can be utilized to determine whether the VoNR toggle 708 is visible or hidden (e.g., the VoNR toggle 708 being visible based on the carrier confirmation VoNR toggle display setting 718 being true), based on the carrier confirmation VoNR toggle display setting 718 having a priority that is greater than a UE default setting and/or a user selected setting for the whether the VoNR toggle 708 is visible or hidden.

In some examples, the carrier configuration VoNR default setting 716 can have a priority that is less than a UE default setting and/or a user selected setting for the whether the VoNR toggle 708 is on or off. The value of the VoNR toggle 708 can be set based on the UE default setting and/or the user selected setting for turning on or off the VoNR toggle 708 in the mobile networks screen 704 (e.g., based on the VoNR toggle 708 being off in the mobile networks screen 704).

Figure 8:
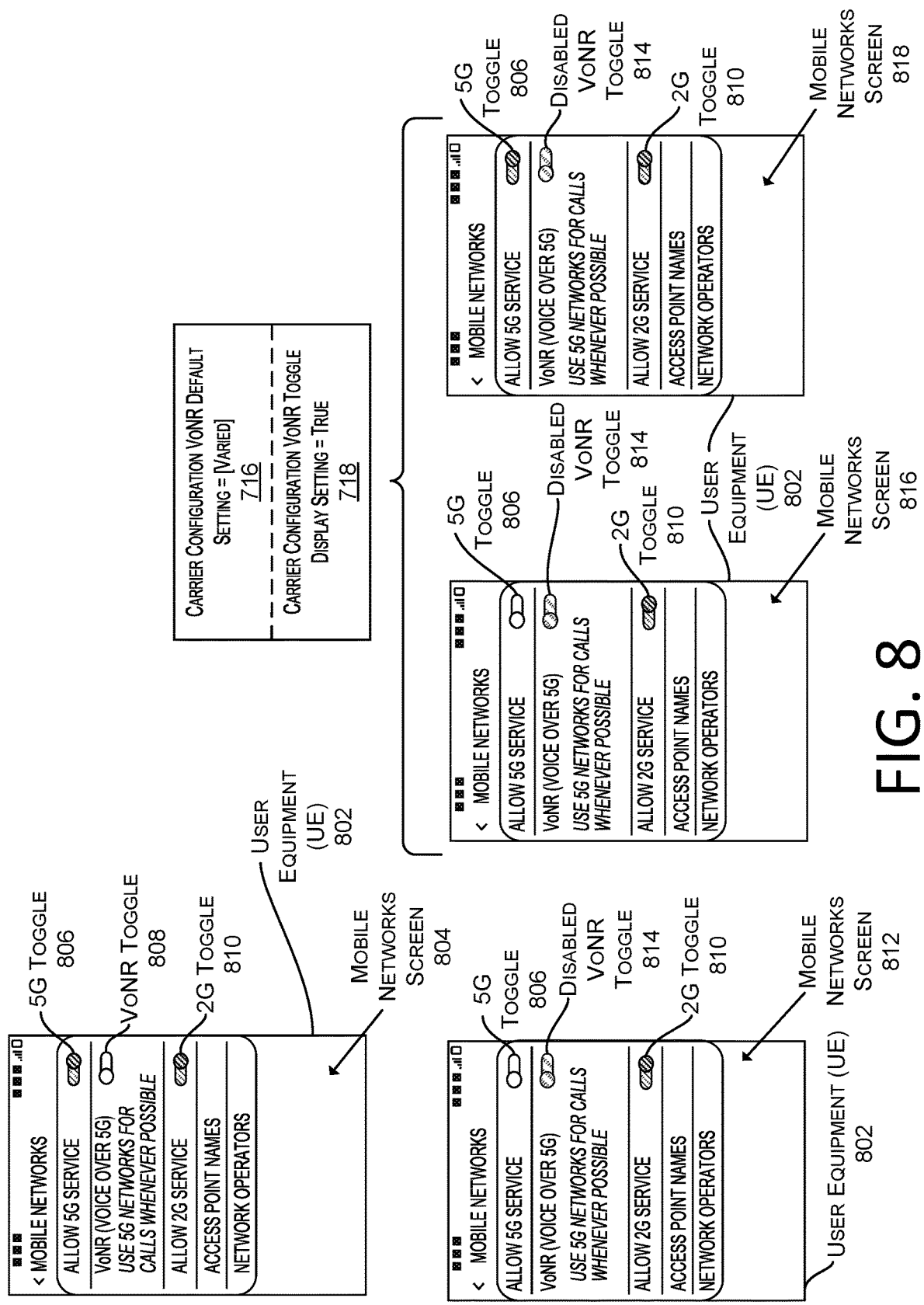
FIG. 8 is a diagram illustrating example user equipment (UE) user interface (UI) screens as illustrated above in FIG. 7, except with a UE voice over new radio (VoNR) identifier being disabled instead of hidden, as described herein.

FIG. 8 is a diagram illustrating example user equipment (UE) user interface (UI) screens as illustrated above in FIG. 7, except with a UE voice over new radio (VoNR) identifier being disabled instead of hidden, as described herein. In some examples, a UE 802 can be utilized to display a mobile networks screen 804, which can include one or more indicators (e.g., one or more toggles), including a fifth generation (5G) toggle 806, a voice over new radio (VoNR) toggle 808, and a second generation (2G) toggle 810, which can be the same as (e.g., have the same values as, be operated in the same way as) the 5G toggle 706, the VoNR toggle 708, and the 2G toggle 710, respectively.

In some examples, the UE 802 can be utilized to implement any of the UE(s) 108 as discussed above with reference to FIG. 1. In those or other examples, the UE 802 can be utilized to display the mobile networks screen 804, and mobile networks screens 812, 816, and 818, which can be associated with different points in time and/or different cellular data values (e.g., values included in, and/or based on, the carrier configuration data and/or the UE cellular network and/or services data) with respect to any of the others.

In some examples, the mobile networks screens 804, 812, 816, and 818, can be controlled in a similar way as for the mobile networks screens 704, 712, 714, and 720, respectively, except with the VoNR toggle 808 being included as a disabled VoNR toggle 814 in the mobile networks screen 812, instead of the VoNR toggle 508 being hidden in the mobile networks screen 712. In those or other examples, the mobile networks screen 816 can display the 5G toggle 806 being off, based on the 5G toggle 806 in the mobile networks screen 804 being toggled (e.g., switched off) by the user. In a similar way as for the mobile networks screen 714, the mobile networks screen 816 can include, based on the 5G toggle 806 in the mobile networks screen 804 being turned off, the disabled VoNR toggle 814 (e.g., in comparison to the VoNR toggle 708 being hidden in the mobile networks screen 714).

In some examples, the UE 802 can receive one or more cellular network and/or services settings, including the carrier configuration VoNR default setting 716 being any of various options (e.g., true, false, ignored (e.g., received and variable, such as being set with a value of the VoNR default setting 322 being true, false, or being undefined (e.g., not set); but, disregarded), or absent), and/or the carrier confirmation VoNR toggle display setting 718 being set to true. The UE 802 can control the disabled VoNR toggle 814 to be visible in the mobile networks screen 818 based on the carrier confirmation VoNR toggle display setting 718 being received and set to true.

Figure 9:
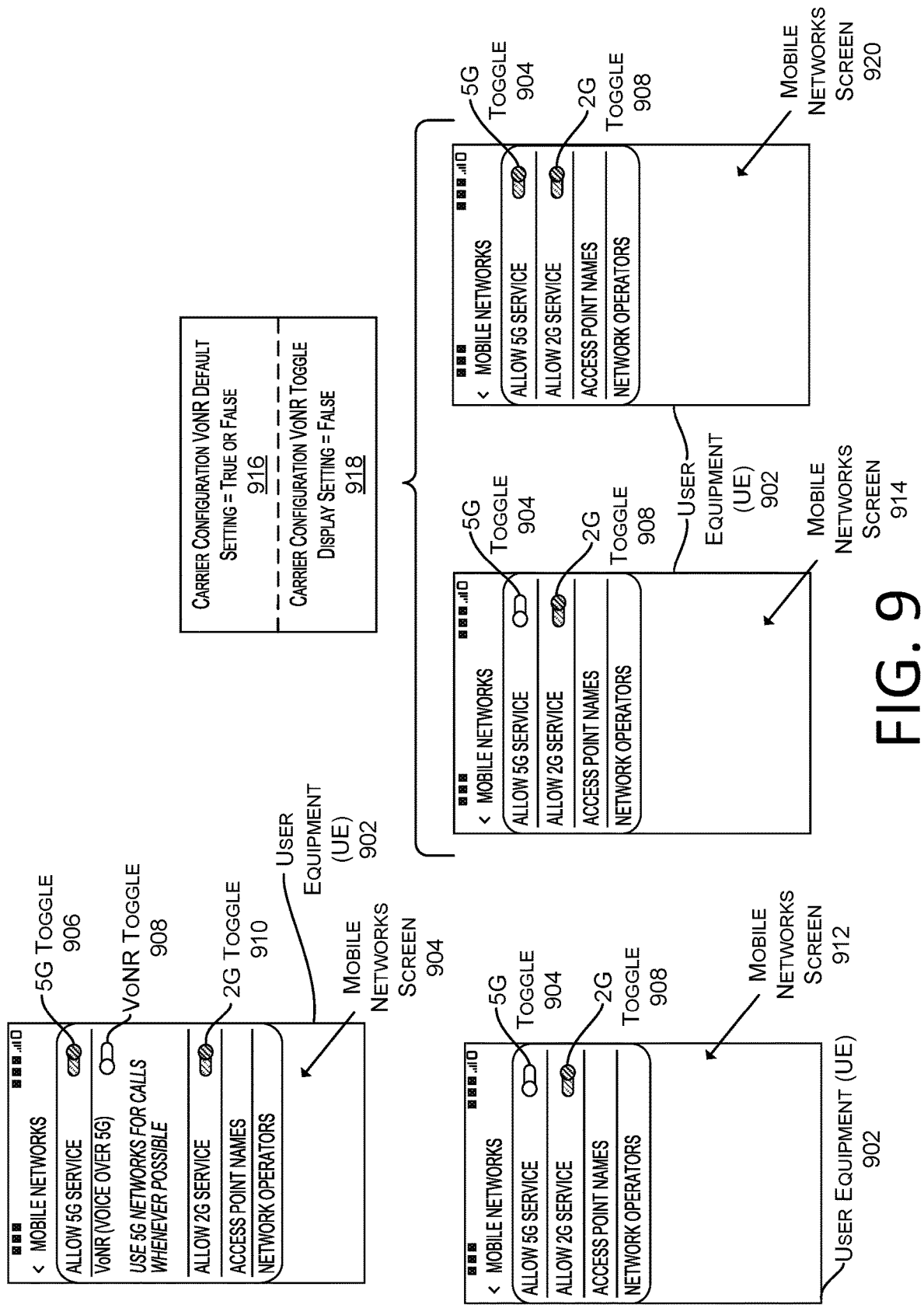
FIG. 9 is a diagram illustrating example user equipment (UE) user interface (UI) screens for selecting cellular networks and/or services for a UE, based on a UE voice over new radio (VoNR) identifier being toggled off and then hidden, a VoNR default identifier being set to true or false, and a VoNR toggle display identifier being set to false, as described herein.

FIG. 9 is a diagram illustrating example user equipment (UE) user interface (UI) screens for selecting cellular networks and/or services for a UE, based on a UE voice over new radio (VoNR) identifier being toggled off and then hidden, a VoNR default identifier being set to true or false, and a VoNR toggle display identifier being set to false, as described herein. In some examples, a UE 902 can be utilized to display a mobile networks screen 904, which can include one or more indicators (e.g., one or more toggles), including a fifth generation (5G) toggle 906, a voice over new radio (VoNR) toggle 908, and a second generation (2G) toggle 910, which can be implemented in a similar way as the 5G toggle 210, the VoNR toggle 212, and the 2G toggle 214, respectively.

In some examples, the UE 902 can be utilized to implement any of the UE(s) 108 as discussed above with reference to FIG. 1. In those or other examples, the UE 902 can be utilized to display the mobile networks screen 904, and mobile networks screens 912, 914, and 920, which can be associated with different points in time and/or different cellular data values (e.g., values included in, and/or based on, the carrier configuration data and/or the UE cellular network and/or services data) with respect to any of the others.

In some examples, at least one initial value and/or at least one user selected value (e.g., at least one previous user selected value) of at least one of the toggle(s) (e.g., the 5G toggle 906 and the 2G toggle 910) in the mobile networks screen 904 can be on (or "triggered"). In those or other examples, at least one initial value and/or at least one user selected value (e.g., at least one previous user selected value) of at least one of the toggle(s) (e.g., the VoNR toggle 908) in the mobile networks screen 904 can be off (or "untriggered").

The UE 902 can control, based on the 5G toggle 906 in the mobile networks screen 904 being selected by a user to be turned from on to off, the VoNR toggle 908 to be hidden in the mobile networks screen 912 and the mobile networks screen 914. The VoNR toggle 908 can be hidden in the mobile networks screen 912 based on a 5G service being turned off, and a VoNR service being unavailable as a result of the 5G service being turned off.

In some examples, the UE 902 displaying the mobile networks screen 914 (e.g., the mobile networks screen 914, for example, being the same as the mobile networks screen 912, except at a same or subsequent point in time) can receive, from the cellular data management system 102, at least one of one or more cellular network and/or services settings (e.g., the cellular network and/or services setting(s) as discussed above with reference to FIG. 1). The cellular network and/or services setting(s) can include a carrier configuration VoNR default setting 916 and/or a carrier confirmation VoNR toggle display setting 918.

In some instances, such as for examples in which the carrier configuration VoNR default setting 916 is received and set to true or false, the VoNR toggle 908 being previously toggled on or off, respectively, can be hidden in the mobile networks screen 920, as a result of the carrier confirmation VoNR toggle display setting 918 being false. For example, the carrier confirmation VoNR toggle display setting 918 can be utilized to determine whether the VoNR toggle 908 is visible or hidden (e.g., the VoNR toggle 908 being hidden based on the carrier confirmation VoNR toggle display setting 918 being false), based on the carrier confirmation VoNR toggle display setting 918 having a priority that is greater than a UE default setting and/or a user selected setting for the whether the VoNR toggle 908 is visible or hidden.

In some examples, the carrier configuration VoNR default setting 916 can have a priority that is greater than a UE default setting and/or a user selected setting for the whether the VoNR toggle 908 is on or off. The value of the VoNR toggle 908 can be set based on the carrier configuration VoNR default setting 916, notwithstanding the UE default setting and/or the user selected setting for turning on or off the VoNR toggle 908 in the mobile networks screen 904 (e.g., based on the VoNR toggle 908 being off in the mobile networks screen 904).

Figure 10:
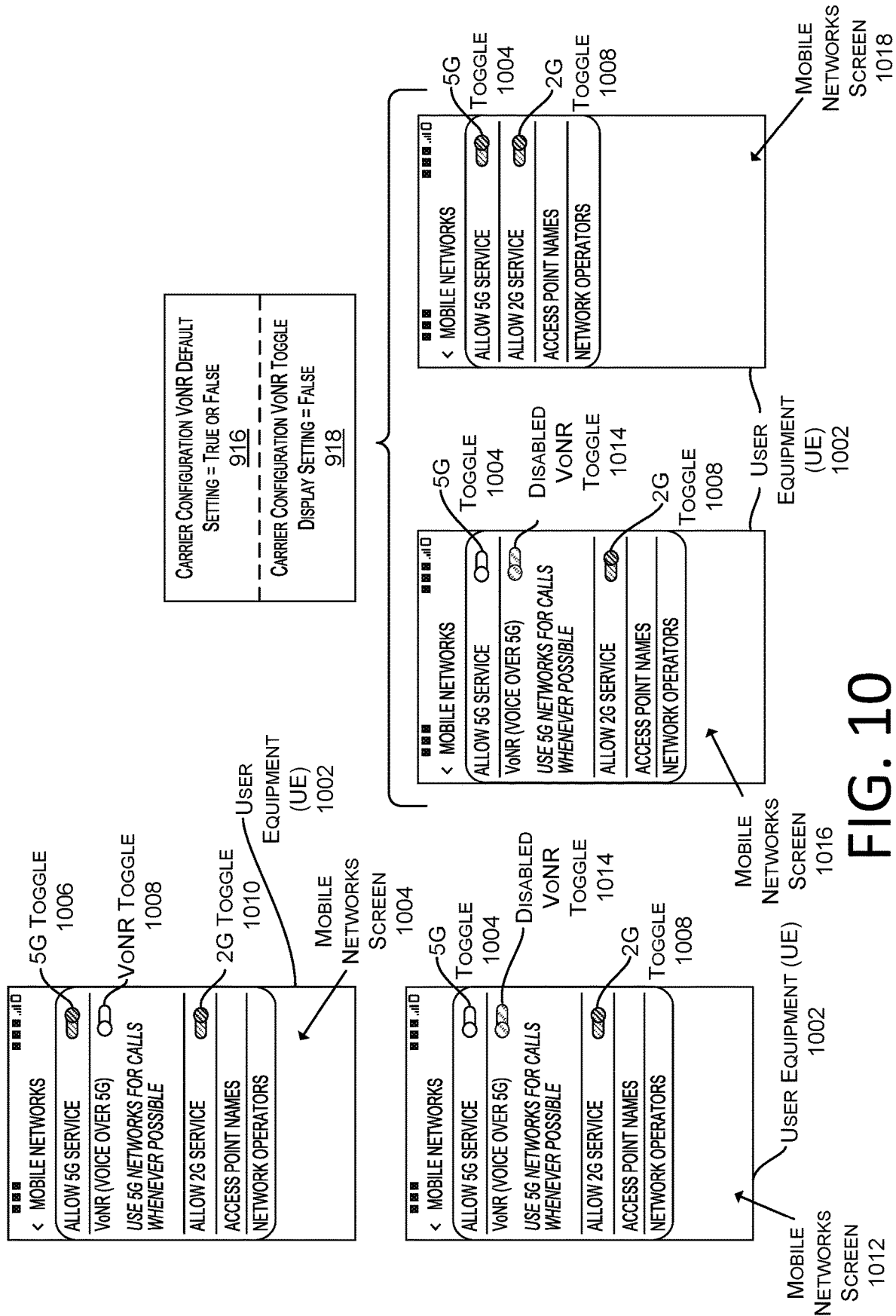
FIG. 10 is a diagram illustrating example user equipment (UE) user interface (UI) as illustrated above in FIG. 5, except with a UE voice over new radio (VoNR) identifier being disabled instead of hidden, as described herein.

FIG. 10 is a diagram illustrating example user equipment (UE) user interface (UI) as illustrated above in FIG. 5, except with a UE voice over new radio (VoNR) identifier being disabled instead of hidden, as described herein. In some examples, a UE 1002 can be utilized to display a mobile networks screen 1004, which can include one or more indicators (e.g., one or more toggles), including a fifth generation (5G) toggle 1006, a voice over new radio (VoNR) toggle 1008, and a second generation (2G) toggle 1010, which can be the same as (e.g., have the same values as, be operated in the same way as) the 5G toggle 906, the VoNR toggle 908, and the 2G toggle 910, respectively.

In those or other examples, the UE 1002 can be utilized to implement any of the UE(s) 108, as discussed above with reference to FIG. 1. In those or other examples, the UE 1002 can be utilized to display the mobile networks screen 1004, and mobile networks screens 1012, 1016, and 1018, which can be associated with different points in time and/or different cellular data values (e.g., values included in, and/or based on, the carrier configuration data and/or the UE cellular network and/or services data) with respect to any of the others.

In some examples, the mobile networks screens 1004, 1012, 1016, and 1018, can be controlled in a similar way as for the mobile networks screens 904, 912, 914, and 920, respectively, except with the VoNR toggle 1008 being included as a disabled VoNR toggle 1014 in the mobile networks screen 1012, instead of the VoNR toggle 908 being hidden in the mobile networks screen 912. In those or other examples, the mobile networks screen 1016 can display the 5G toggle 1006 being off, based on the 5G toggle 1006 in the mobile networks screen 1004 being toggled (e.g., switched off) by the user. In a similar way as for the mobile networks screen 914, the mobile networks screen 1016 can include, based on the 5G toggle 1006 in the mobile networks screen 1004 being turned off, the disabled VoNR toggle 1014 (e.g., in comparison to the VoNR toggle 908 being hidden in the mobile networks screen 914).

In some examples, the UE 1002 can receive one or more cellular network and/or services settings, including the carrier configuration VoNR default setting 916 being set to true or false, and/or the carrier confirmation VoNR toggle display setting 918 being set to false. The UE 1002 can control the disabled VoNR toggle 1014 to be hidden in the mobile networks screen 1018 (e.g., similar to the VoNR toggle 908 being hidden in the mobile networks screen 920), based on the carrier confirmation VoNR toggle display setting 918 being received and set to false.

Figure 11:
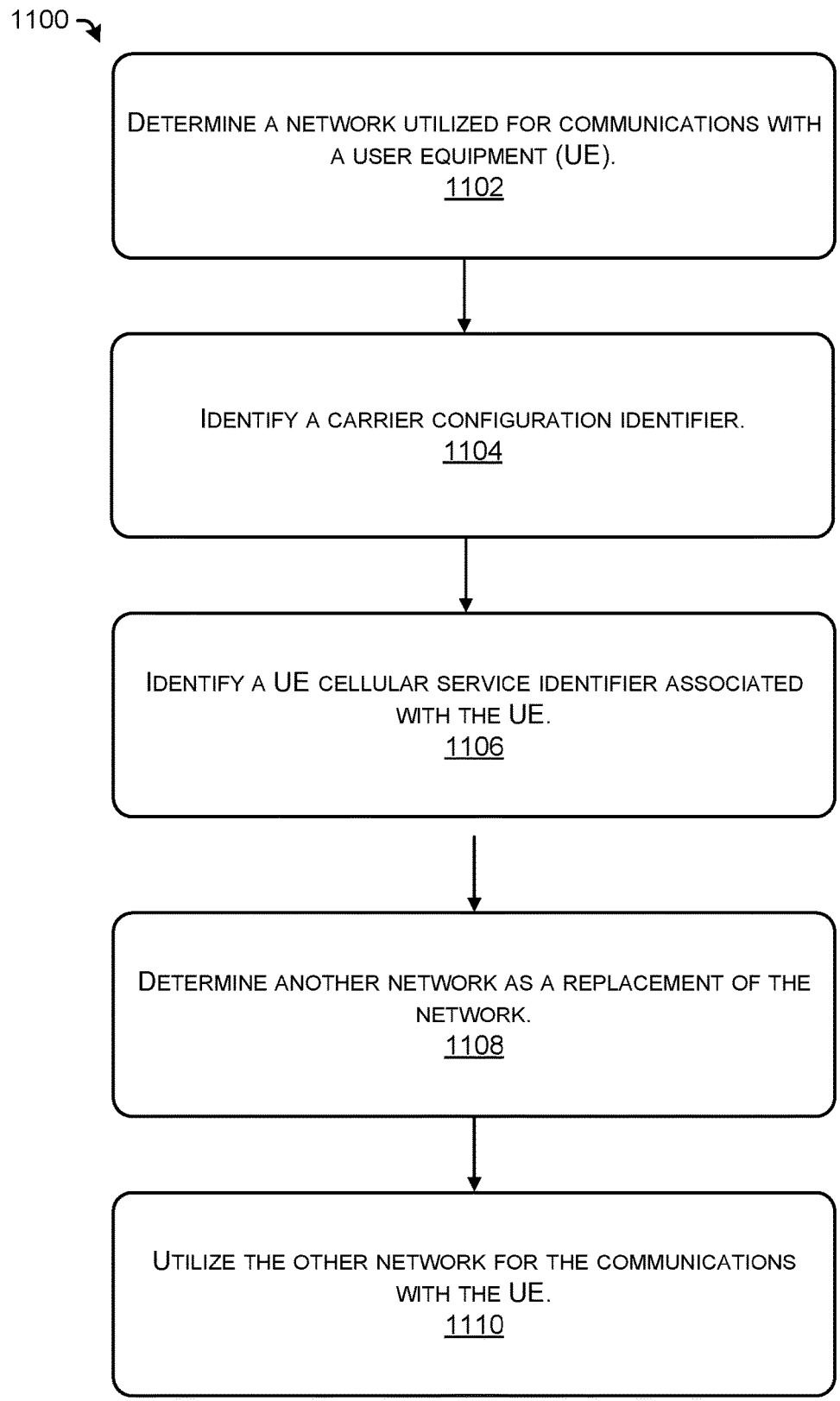
FIG. 11 is a flow diagram of an illustrative process for managing telecommunication network and/or services selection data, in accordance with examples of the disclosure.

FIG. 11 is a flow diagram of an illustrative process 1100 for managing telecommunication network and/or services selection data, in accordance with examples of the disclosure. At least part of the process 1100 may be performed by a cellular data management system (e.g., the cellular data management system 102, as discussed above with reference to FIG. 1), as discussed above with reference to FIG. 1, and/or by any other suitable computing device(s), as described herein.

At operation 1102, the process can include determining a network utilized for communications with a user equipment (UE) 108. The network can include an initial network determined for the UE 108.

At operation 1104, the process can include identifying a carrier configuration identifier. The carrier configuration identifier can include a value associated with a type of network and/or a type of service, such as a voice service. For example, the carrier configuration identifier can include a value of on for a 5G network toggle associated with the UE 108 being connected to the 5G network and/or voice over new radio (VoNR) toggle associated with the UE 108 being enabled to utilize VoNR.

In some examples, the carrier configuration identifier can include a default setting for VoNR as being true or false, for the UE 108 to use the VoNR or not use the VoNR, respectively. In those or other examples, a carrier configuration identifier can include a display setting for a VoNR toggle 212 as being visible or hidden, for the UE 108 to display the VoNR toggle visibly or to hide the VoNR toggle. Any toggle being displayed visibly can include the toggle being presented via the display of the UE 108.

In those or other examples, the carrier configuration identifier can include a default setting for fifth generation (5G) as being true or false, for the UE to use a 5G network or not use the 5G network, respectively. In those or other examples, another carrier configuration identifier can include a display setting for a 5G toggle 210 as being visible or hidden, for the UE 108 to display the 5G toggle 210 visibly or to hide the 5G toggle 210. The carrier configuration identifier(s) for the default setting for the 5G network and/or the display setting for the 5G toggle 210 can be implemented, for purposes of any of the techniques as discussed herein, in a similar way as for the carrier configuration identifier including the default setting for VoNR and/or the carrier configuration identifier can including the display setting for the VoNR toggle 212, respectively. For example, carrier configuration identifier(s) for a default setting for any network and/or a display setting for a network toggle can override a UE setting and/or a user selected setting for any network and/or a display setting for any network toggle, respectively.

At operation 1106, the process can include identifying a UE cellular service identifier associated with the UE 108. In some examples, the UE cellular service identifier can be identified from among one or more UE cellular network and/or services identifiers. Individual ones of the UE cellular network and/or services identifier(s) can be associated with any type of network, such as a value of off for a 5G toggle or a value of off for a VoNR toggle.

At operation 1108, the process can include determining another network as a replacement of the network. The network can be determined to be utilized for the UE based on the carrier configuration overriding the UE cellular service identifier. The carrier configuration including the value of on for the 5G network or VoNR can be utilized instead of the UE cellular service identifier including the value of off for the 5G network or VoNR. The carrier configuration including a value for the 5G network toggle or the VoNR toggle to be displayed visibly or hidden, can be utilized instead of the UE cellular service identifier including a value for the 5G network toggle or the VoNR toggle to be displayed visibly or hidden.

At operation 1110, the process can include utilizing the other network for the communications with the UE. For example, the 5G network can be utilized for the UE 108, based on the carrier configuration identifier, notwithstanding the UE 108 having previously had the 5G toggle switched off. In such an example or other examples, a toggle can be displayed visibly by the UE 108, based on the carrier configuration identifier, notwithstanding the UE 108 having previously had the 5G toggle hidden. The network and/or service associated with the carrier configuration identifier(s) can be determined as replacement(s) for the network and/or service associated with the UE cellular service identifier(s).

Figure 12:
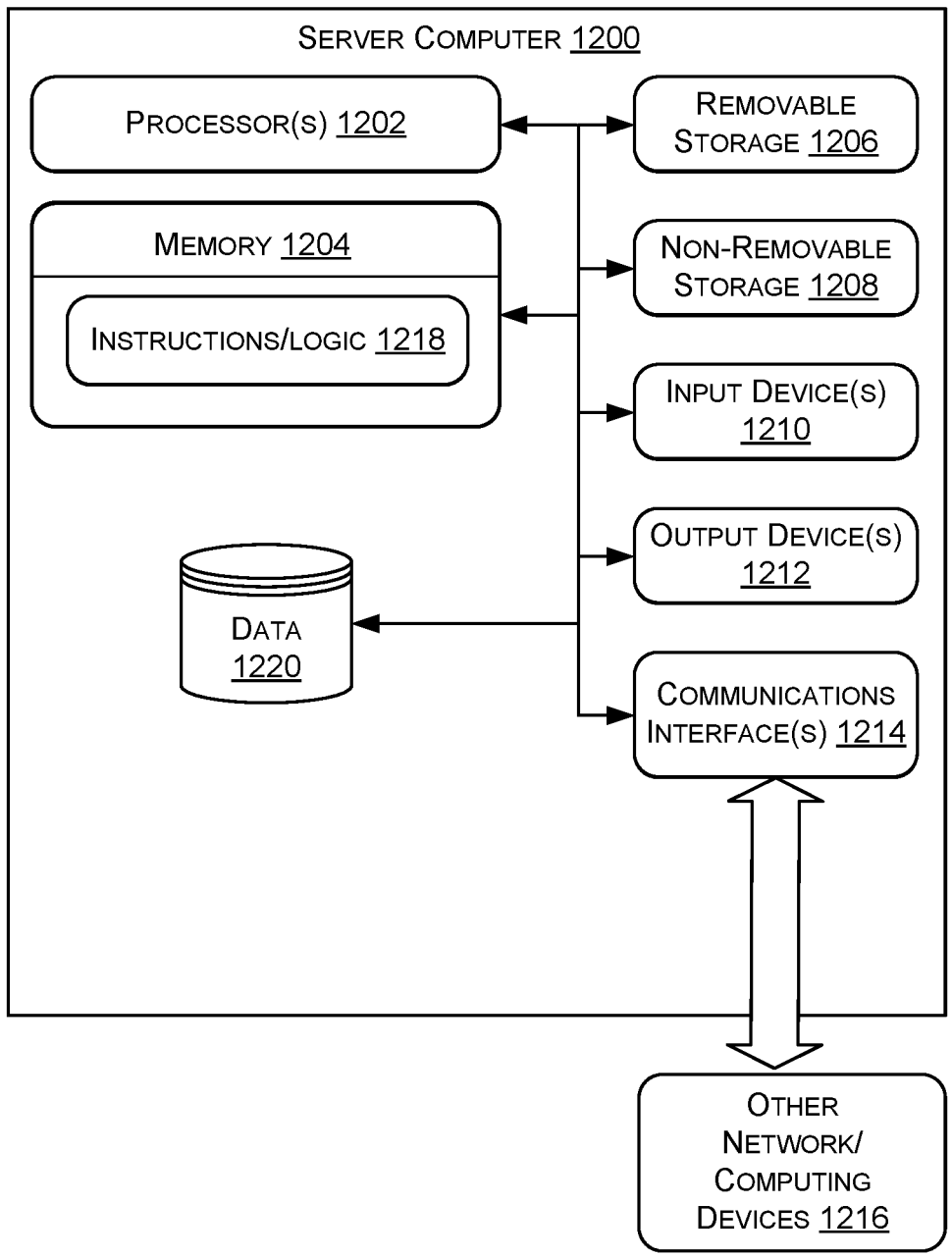
FIG. 12 is a block diagram of an example server computer utilized to implement telecommunication network and/or services selection data management systems, in accordance with some examples of the present disclosure.

FIG. 12 is a block diagram of an example server computer utilized to implement telecommunication network and/or services selection data management systems, in accordance with some examples of the present disclosure.

The server computer 1200 may be representative of a cellular data management system (e.g., the cellular data management system 102, as discussed above with reference to FIG. 1), and/or a device (e.g., a server) in the cellular data management system 102.

As shown, the server computer 1200 may include one or more processors 1202 and one or more forms of computer-readable memory 1204. The server computer 1200 may also include additional storage devices. Such additional storage may include removable storage 1206 and/or non-removable storage 1208.

The server computer 1200 may further include input devices 1210 (e.g., a touch screen, keypad, keyboard, mouse, pointer, microphone, etc.) and output devices 1212 (e.g., a display, printer, speaker, etc.) communicatively coupled to the processor(s) 1202 and the computer-readable memory 1204. The server computer 1200 may further include communications interface(s) 1214 that allow the server computer 1200 to communicate with other computing devices 1216 (e.g., the UE(s) 108, etc.) such as via a network. The communications interface(s) 1214 may facilitate transmitting and receiving wired and/or wireless signals over any suitable communications/data technology, standard, or protocol, as described herein.

In various embodiments, the computer-readable memory 1204 comprises non-transitory computer-readable memory 1204 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 1204 may also be described as computer storage media and may include volatile and nonvolatile, removable and non-removable media implemented in any method or technology for storage of information, such as computer readable instructions, data structures, program modules, or other data. Computer-readable memory 1204, removable storage 1206 and non-removable storage 1208 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server computer 1200. Any such computer-readable storage media may be part of the server computer 1200.

The memory 1204 can include logic 1218 (i.e., computer-executable instructions that, when executed, by the processor(s) 1202, perform the various acts and/or processes disclosed herein) to implement synchronization of subscriber data, according to various examples as discussed herein. For example, the logic 1218 is configured to carry out signaling and/or communications associated with and the UE(s) 108. The memory 1204 can further be used to store data 1220, which may be used to implement synchronization of subscriber data, as discussed herein. In one example, the data 1220 may include network information (e.g., the network information, as discussed above with reference to FIG. 1) and/or mobile device information (e.g., the mobile device information, as discussed above with reference to FIG. 1).

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A system comprising:
one or more processors; and
non-transitory memory storing computer-executable instructions that, when executed by the one or more processors, cause the one or more processors to perform operations comprising:
determining a network of a first network type associated with a user equipment (UE);
utilizing the network of the first network type to route one or more first communications for the UE;
identifying a carrier configuration identifier associated with a second network type, the carrier configuration identifier being utilized to identify a carrier selected network or a carrier selected service;
identifying a first UE cellular service identifier associated with a third network type, the first UE cellular service identifier being utilized to identify a UE selected network or a UE selected service;
determining, as a replacement of the network of the first network type, another network of at least one of the second network type or the third network type;
utilizing the another network to route one or more second communications for the UE;
causing presentation by a display of the UE of i) a first indicator representing a first value of the first UE cellular service identifier associated with a fifth generation (5G) network, ii) a second indicator representing a second value of a second UE cellular service identifier associated with a second generation (2G) network, and iii) a third indicator representing a third value of a third UE cellular service identifier associated with voice over new radio (VoNR);
receiving, from the UE, a first user selection of at least one of the first indicator, the second indicator, or the third indicator, the first user selection being received by the UE via a first user input to a first user interface (UI) of the UE;
updating at least one of the first UE cellular service identifier, the second UE cellular service identifier, or the third UE cellular service identifier, based on the first user selection; and
causing presentation of at least one of the first indicator, the second indicator, or the third indicator to be updated, based on the updating of at least one of the first UE cellular service identifier, the second UE cellular service identifier, or the third UE cellular service identifier.

2. The system of claim 1, the operations further comprising: identifying the third UE cellular service identifier associated with the VoNR.

3. The system of claim 1, wherein the carrier configuration identifier is a first carrier configuration identifier of the 5G network.

4. The system of claim 1, wherein the identifying the carrier configuration identifier further comprises receiving, from a service provider server, an Extensible Markup Language (XML) file indicating the carrier configuration identifier, the XML file being pushed by the service provider server to the UE to store the carrier configuration identifier.

5. The system of claim 1, wherein the identifying the first UE cellular service identifier further comprises receiving, from the UE, a second user selection of the first UE cellular service identifier, the second user selection being received by the UE via a second user input to a second user interface (UI) of the UE.

6. The system of claim 1, wherein the carrier configuration identifier overrides the first UE cellular service identifier and is utilized by the UE to identify whether to present, via the display of the UE, the first indicator associated with the first UE cellular service identifier.

7. The system of claim 1, wherein the carrier configuration identifier overrides the first UE cellular service identifier, and the carrier configuration identifier is utilized to identify whether to cause presentation, via the display of the UE, of the first indicator associated with the first UE cellular service identifier.

8. The system of claim 1, the operations further comprising:
   causing the UE to present the first indicator associated with the first UE cellular service identifier; and
   causing the UE to present another indicator associated with a UE call setting identifier.

9. The system of claim 1, the operations further comprising:
   based on the first UE cellular service identifier having a value of false, causing the UE to refrain from presenting an indicator associated with a UE call setting identifier.

10. A system comprising:
    one or more processors;
    a non-transitory memory; and
    one or more components stored in the memory and executable by the one or more processors to perform operations comprising:
    determining a network utilized for communications with a user equipment (UE);
    identifying a carrier configuration identifier;
    identifying a first UE cellular service identifier associated with the UE;
    determining another network as a replacement of the network based on the carrier configuration identifier overriding the first UE cellular service identifier;
    utilizing the another network for the communications with the UE;
    causing presentation by a display of the UE of i) a first indicator representing a first value of the first UE cellular service identifier associated with a fifth generation (5G) network, ii) a second indicator representing a second value of a second UE cellular service identifier associated with a second generation (2G) network, and iii) a third indicator representing a third value of a third UE cellular service identifier associated with voice over new radio (VoNR);
    receiving, from the UE, a first user selection of at least one of the first indicator, the second indicator, or the third indicator, the first user selection being received by the UE via a first user input to a first user interface (UI) of the UE;
    updating at least one of the first UE cellular service identifier, the second UE cellular service identifier, or the third UE cellular service identifier, based on the first user selection; and
    causing presentation of at least one of the first indicator, the second indicator, or the third indicator to be updated, based on the updating of at least one of the first UE cellular service identifier, the second UE cellular service identifier, or the third UE cellular service identifier.

11. The system of claim 10, the operations further comprising:
    identifying the third UE cellular service identifier associated with the VoNR.

12. The system of claim 10, wherein the identifying the carrier configuration identifier further comprises receiving, from a service provider server, an Extensible Markup Language (XML) file indicating the carrier configuration identifier, the XML file being pushed by the service provider server to the UE to store the carrier configuration identifier.

13. The system of claim 10, wherein the identifying the first UE cellular service identifier further comprises receiving, from the UE, a second user selection of the first UE cellular service identifier, the second user selection being received by the UE via a second user input to a second user interface (UI) of the UE.

14. The system of claim 10, wherein the carrier configuration identifier is utilized by the UE to identify whether to cause presentation, via the display of the UE, of the first indicator associated with the first UE cellular service identifier.

15. A method comprising:
    determining a network utilized for communications with a user equipment (UE);
    identifying a carrier configuration identifier;
    identifying a first UE cellular service identifier associated with the UE;
    determining another network as a replacement of the network;
    utilizing the another network for the communications with the UE;
    causing presentation by a display of the UE of i) a first indicator representing a first value of the first UE cellular service identifier associated with a fifth generation (5G) network, ii) a second indicator representing a second value of a second UE cellular service identifier associated with a second generation (2G) network, and iii) a third indicator representing a third value of a third UE cellular service identifier associated with voice over new radio (VoNR);
    receiving, from the UE, a first user selection of at least one of the first indicator, the second indicator, or the third indicator, the first user selection being received by the UE via a first user input to a first user interface (UI) of the UE;
    updating at least one of the first UE cellular service identifier, the second UE cellular service identifier, or the third UE cellular service identifier, based on the first user selection; and
    causing presentation of at least one of the first indicator, the second indicator, or the third indicator to be updated, based on the updating of at least one of the first UE cellular service identifier, the second UE cellular service identifier, or the third UE cellular service identifier.

16. The method of claim 15, further comprising:
    identifying the third UE cellular service identifier associated with the VoNR.

17. The method of claim 15, wherein the identifying the carrier configuration identifier further comprises receiving, from a service provider server, an Extensible Markup Language (XML) file indicating the carrier configuration identifier, the XML file being pushed by the service provider server to the UE to store the carrier configuration identifier.

* * * * *